(12) United States Patent
Katou et al.

(10) Patent No.: US 10,191,254 B2
(45) Date of Patent: Jan. 29, 2019

(54) WIDE-ANGLE LENS AND IMAGING UNIT

(71) Applicant: SONY CORPORATION, Tokyo (JP)

(72) Inventors: Kouji Katou, Saitama (JP); Kota Omiya, Kanagawa (JP); Hiroshi Koizumi, Kanagawa (JP); Naoki Miyagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/512,644

(22) PCT Filed: Aug. 24, 2015

(86) PCT No.: PCT/JP2015/073662
§ 371 (c)(1),
(2) Date: Mar. 20, 2017

(87) PCT Pub. No.: WO2016/056310
PCT Pub. Date: Apr. 14, 2016

(65) Prior Publication Data
US 2017/0293117 A1     Oct. 12, 2017

(30) Foreign Application Priority Data

Oct. 9, 2014   (JP) .................................. 2014-207959

(51) Int. Cl.
*G02B 9/14*       (2006.01)
*G02B 13/18*      (2006.01)
(Continued)

(52) U.S. Cl.
CPC .............. *G02B 13/04* (2013.01); *G02B 9/14* (2013.01); *G02B 13/18* (2013.01); *H04N 5/2254* (2013.01)

(58) Field of Classification Search
CPC ... G02B 9/12; G02B 9/14; G02B 9/16; G02B 9/18; G02B 9/20; G02B 9/22; G02B 9/24;
(Continued)

(56) References Cited

U.S. PATENT DOCUMENTS 8,810,931 B2 *   8/2014   Sunaga .................... G02B 9/64
                                                      359/748
8,953,260 B2 *   2/2015   Kim ....................... G02B 15/177
                                                      359/716
(Continued)

FOREIGN PATENT DOCUMENTS

EP          2149809 A1      2/2010
JP        2000-284171 A    10/2000
(Continued)

OTHER PUBLICATIONS

International Search Report and Written Opinion of PCT Application No. PCT/JP2015/073662, dated Nov. 24, 2015, 06 pages of English Translation and 06 pages of ISRWO.
(Continued)

*Primary Examiner* — Darryl J Collins
(74) *Attorney, Agent, or Firm* — Chip Law Group

(57) ABSTRACT

A wide-angle lens includes a first lens group, an aperture stop, a second lens group, and a third lens group. The first lens group has positive refractive power. The second lens group has negative refractive power. The third lens group has positive refractive power. The first lens group, the aperture stop, the second lens group, and the third lens group are disposed in order from the object side toward image side. The first lens group includes a negative lens and at least one cemented lens, the negative lens being disposed on most-object side and has a convex surface facing the object side. The following conditional expression is satisfied, $0.5 < f1/f < 1.0$     (1)

(Continued)

where f1 is a focal distance of the first lens group in a condition that infinite is in focus, and f is a focal distance of a whole system in the condition that the infinite is in focus.

10 Claims, 16 Drawing Sheets

(51) Int. Cl.
 *G02B 13/04* (2006.01)
 *H04N 5/225* (2006.01)
(58) Field of Classification Search
 CPC ... G02B 9/26; G02B 9/28; G02B 9/30; G02B 9/32
 USPC .................................. 359/716, 748, 784, 785
 See application file for complete search history.

(56) References Cited

U.S. PATENT DOCUMENTS

2010/0020408 A1  1/2010  Noguchi
2012/0194924 A1* 8/2012  Sakai .................. G02B 9/24
                                                                  359/738
2013/0265648 A1  10/2013  Saori
2014/0055558 A1  2/2014  Souma

FOREIGN PATENT DOCUMENTS

| JP | 2010-032680 A | 2/2010 |
| JP | 2010-32680 A | 2/2010 |
| JP | 2010-097207 A | 4/2010 |
| JP | 2013-231941 A | 11/2013 |
| JP | 2013-257395 A | 12/2013 |

OTHER PUBLICATIONS

International Preliminary Report on Patentability of PCT Application No. PCT/JP2015/073662, dated Apr. 20, 2017, 07 pages of English Translation and 03 pages of IPRP.

* cited by examiner

[ FIG. 1 ]
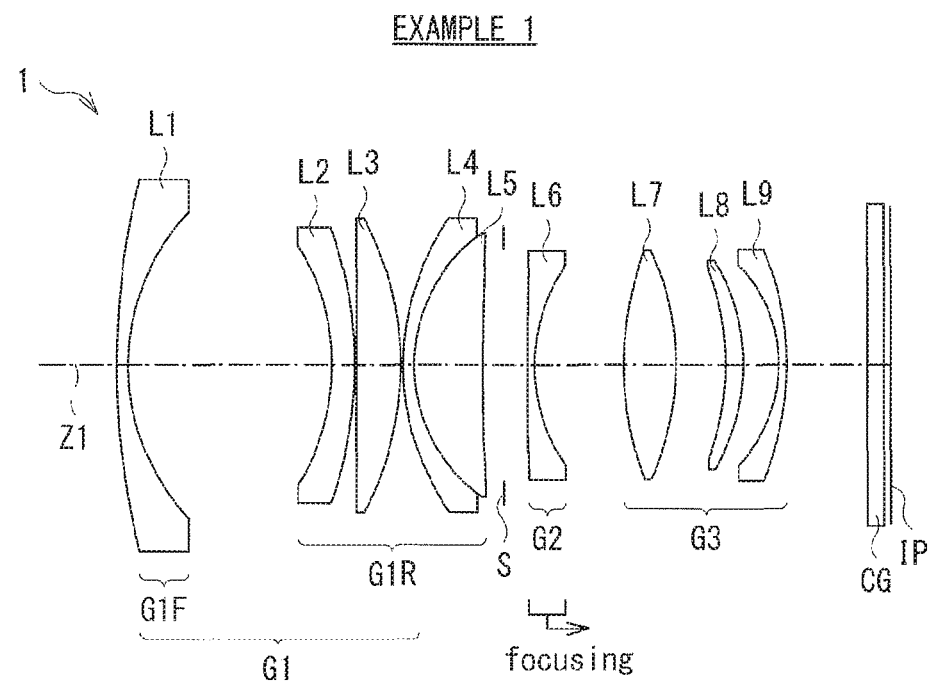
[ FIG. 2 ]
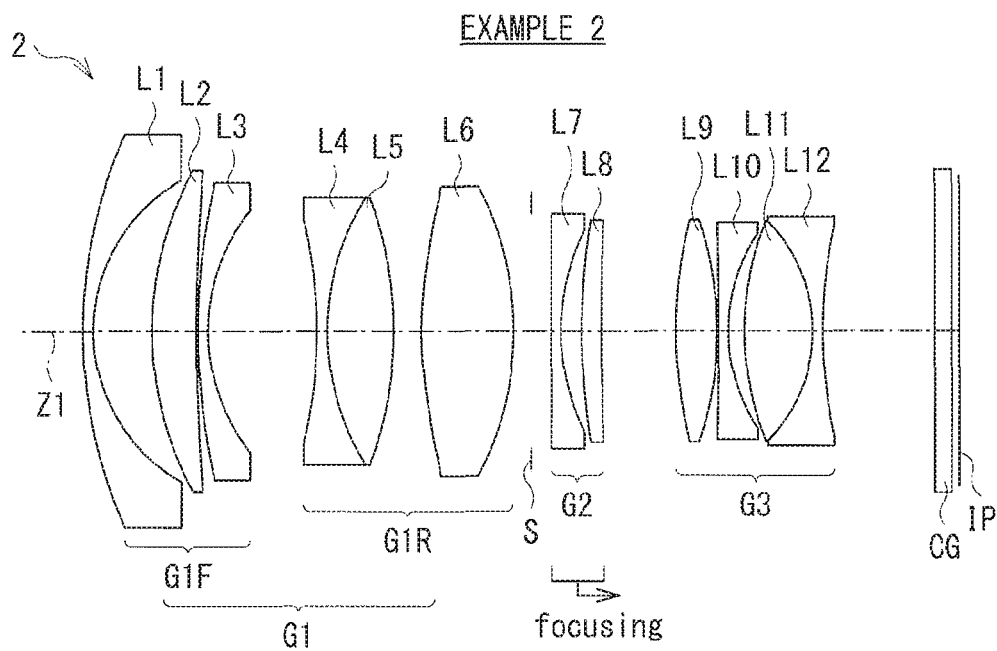

[ FIG. 3 ]
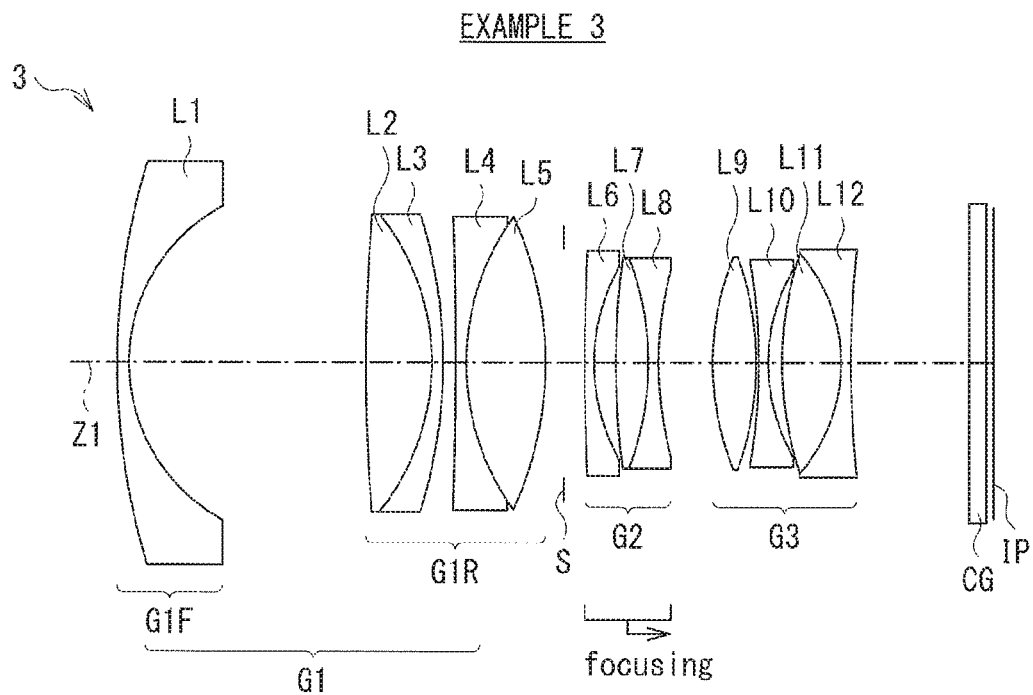
[ FIG. 4 ]
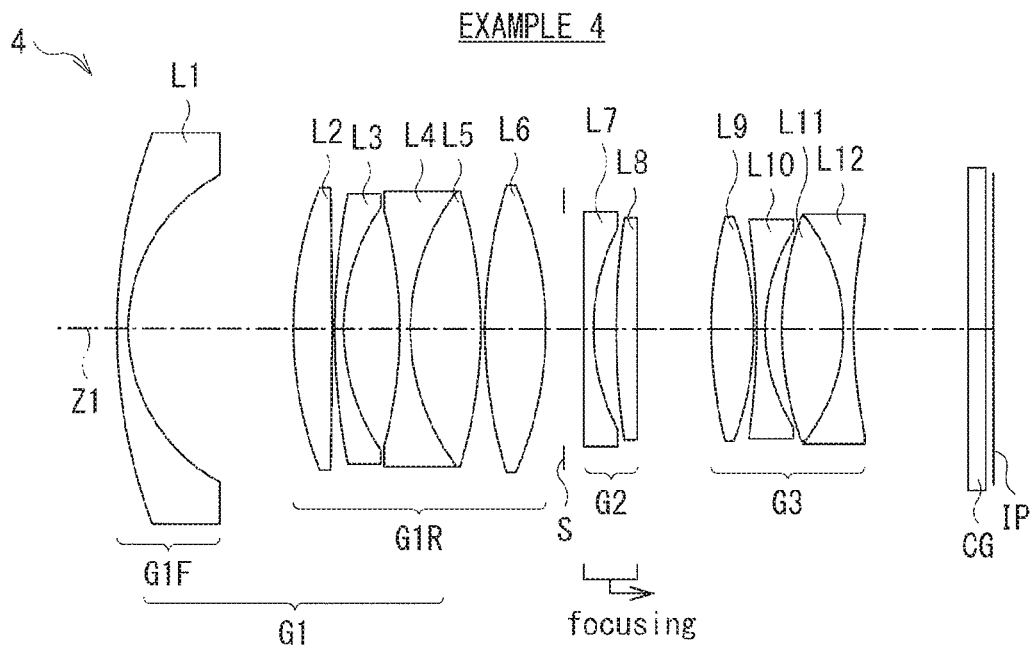

[ FIG. 5 ]
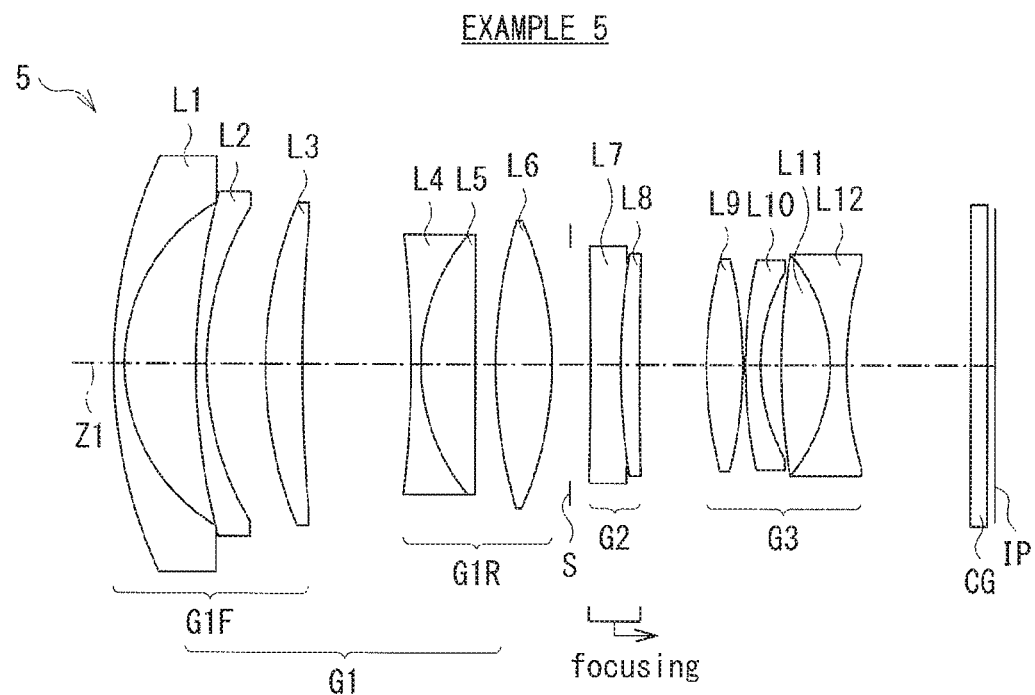
[ FIG. 6 ]
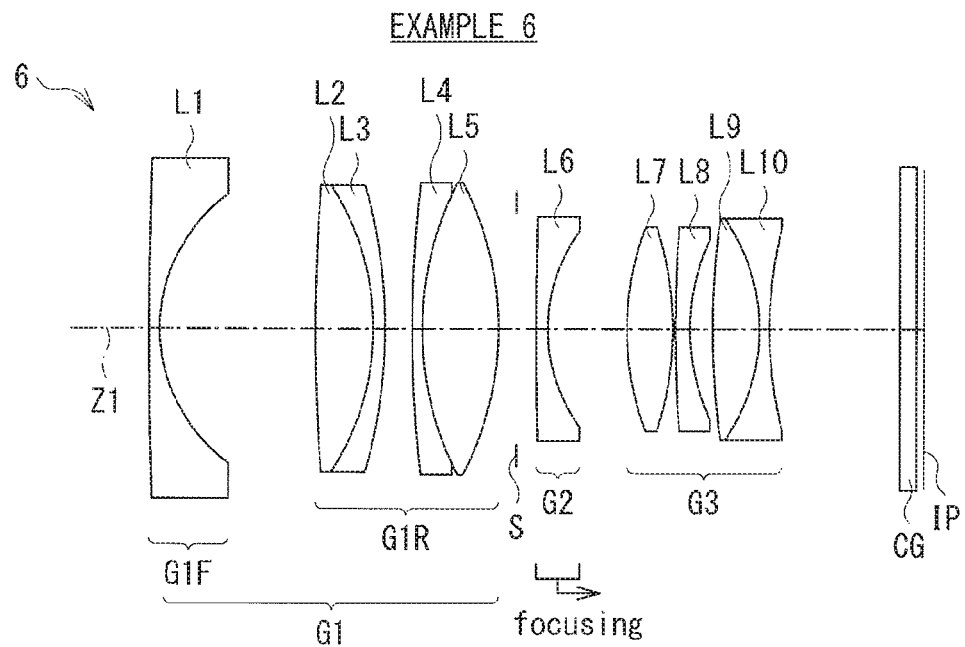

[ FIG. 7 ]
EXAMPLE 7
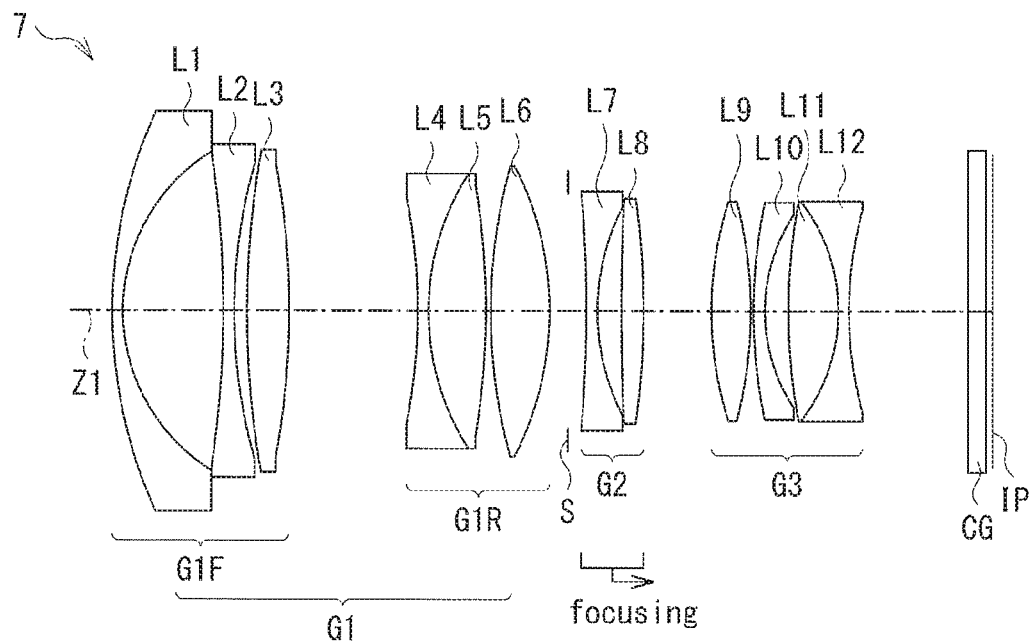
[ FIG. 8 ]
EXAMPLE 8
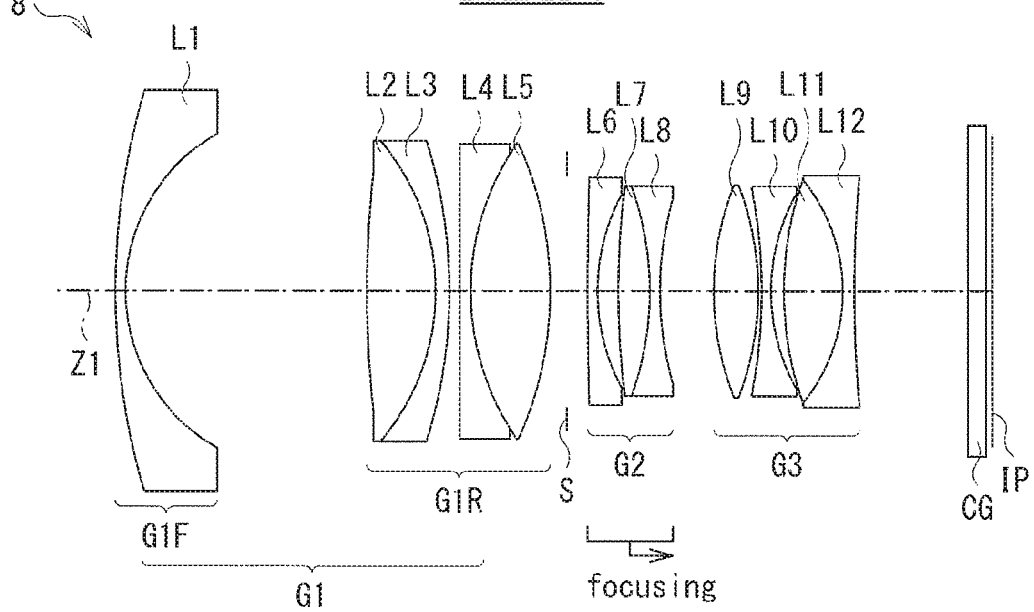

[FIG. 9]
EXAMPLE 9
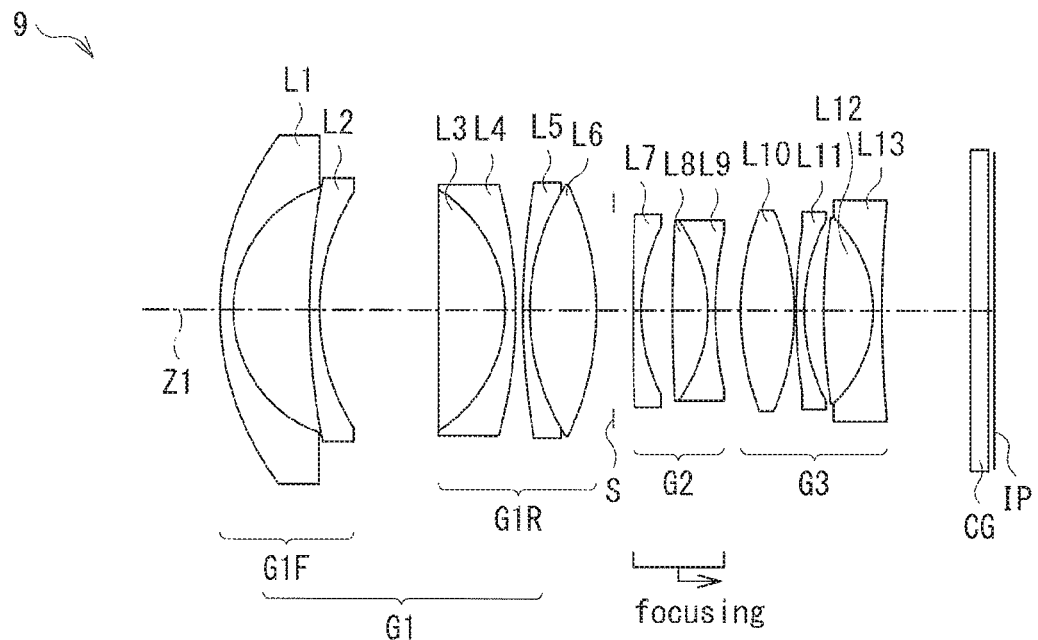
[FIG. 10]
EXAMPLE 10
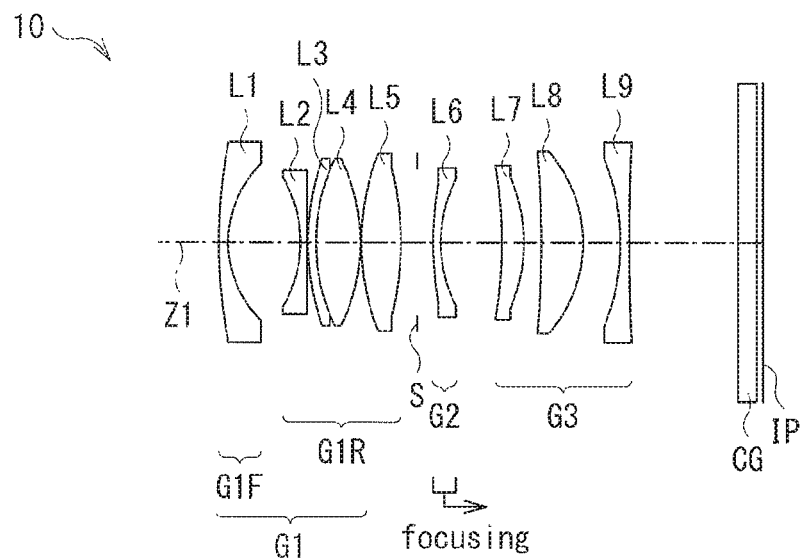

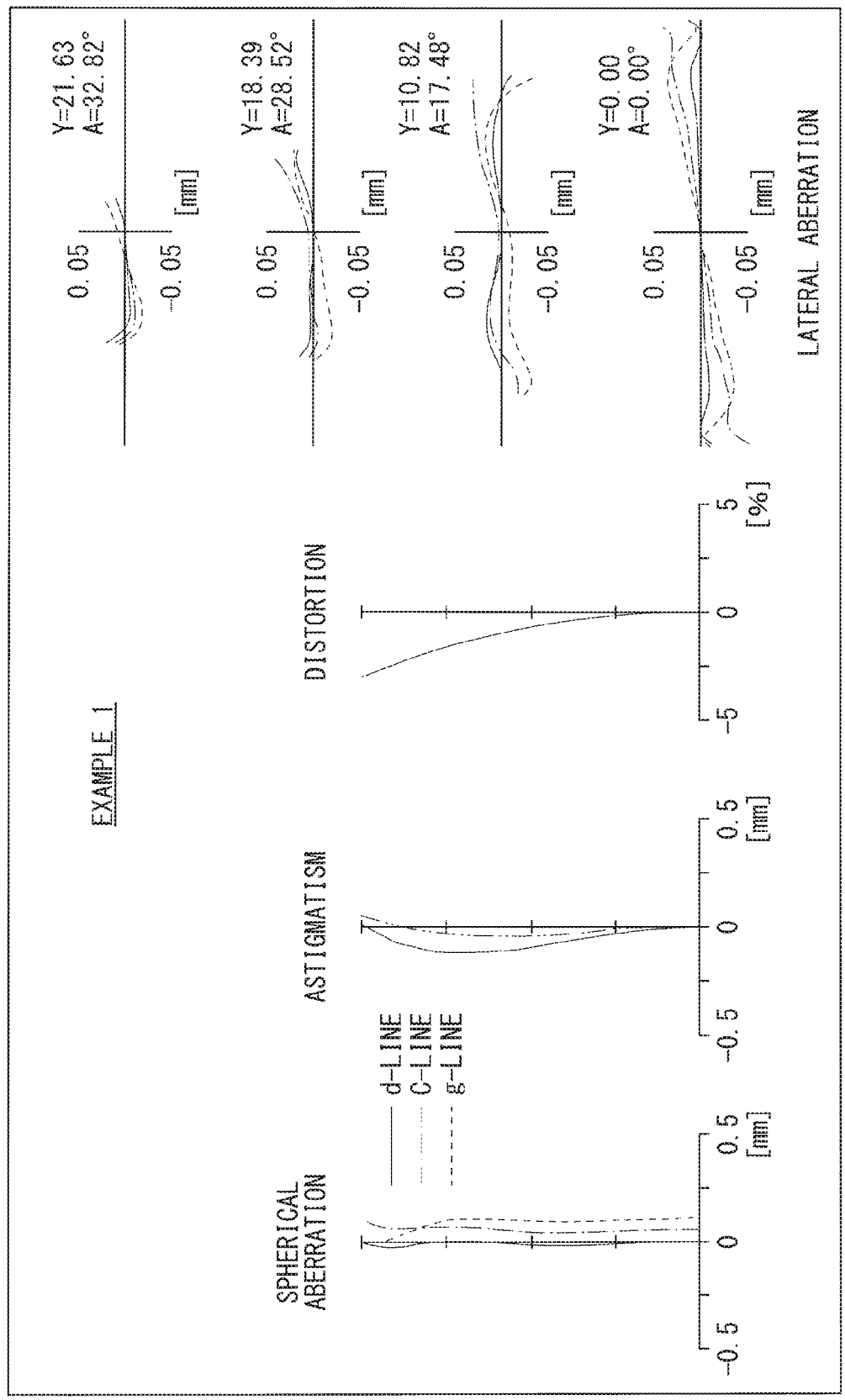

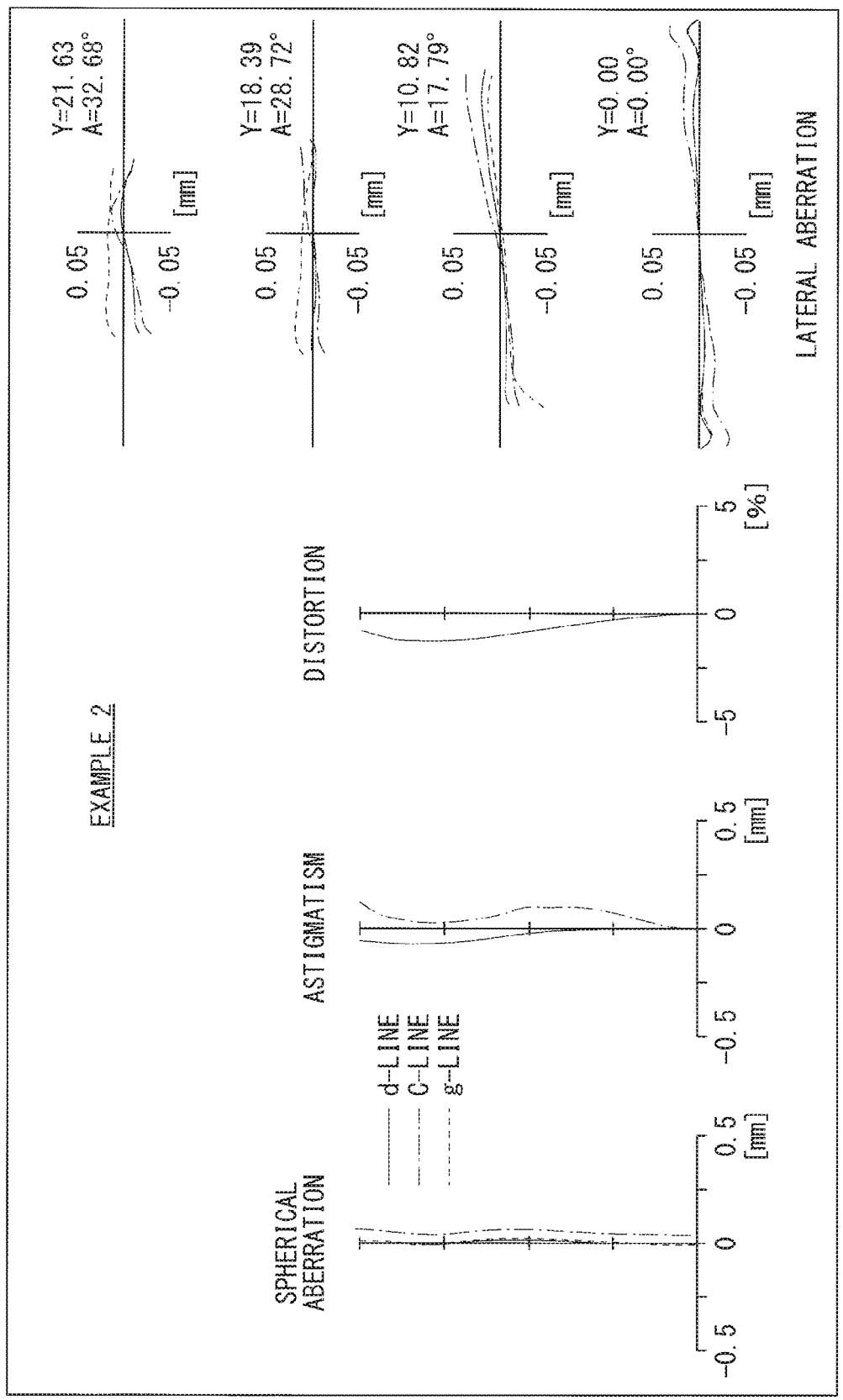

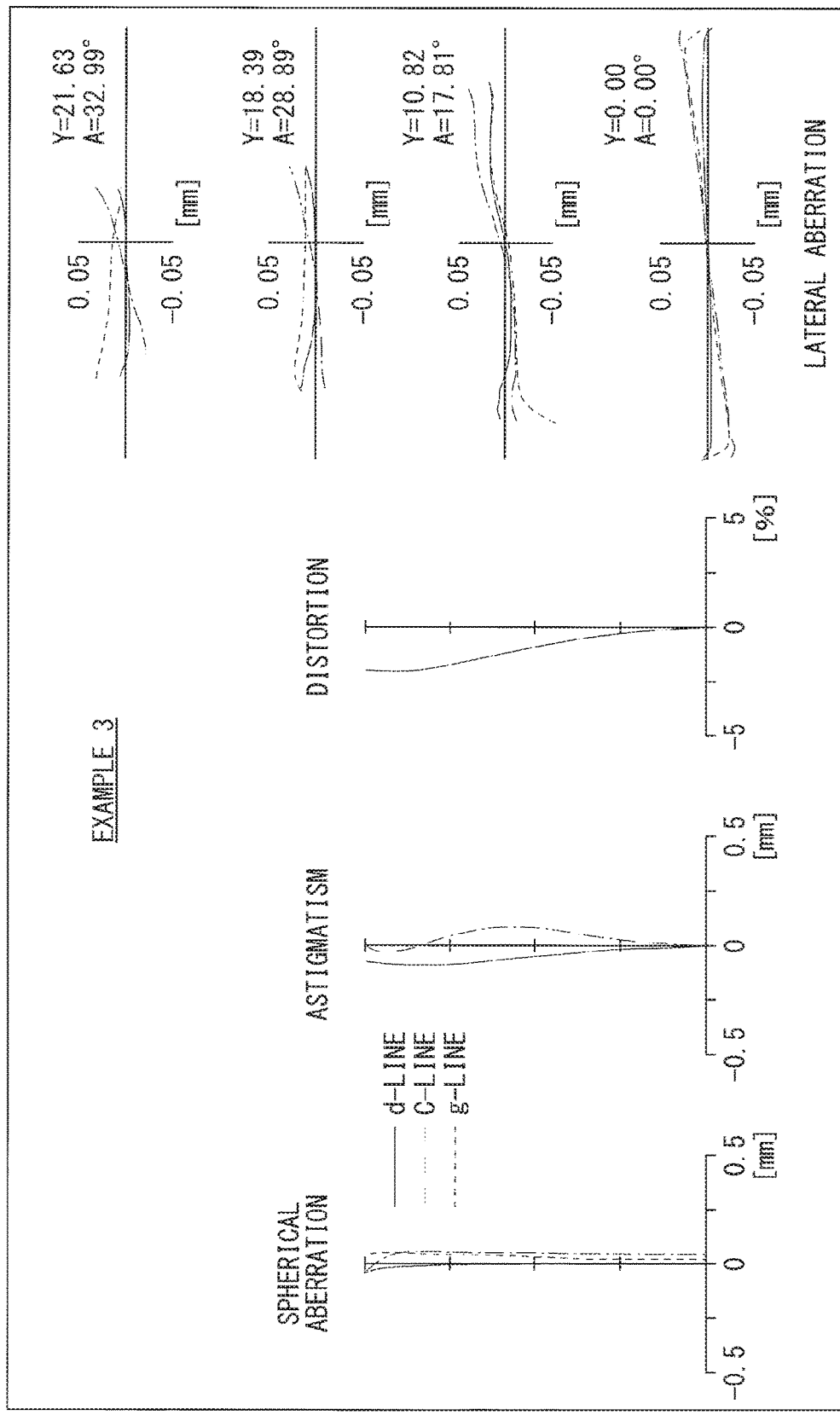

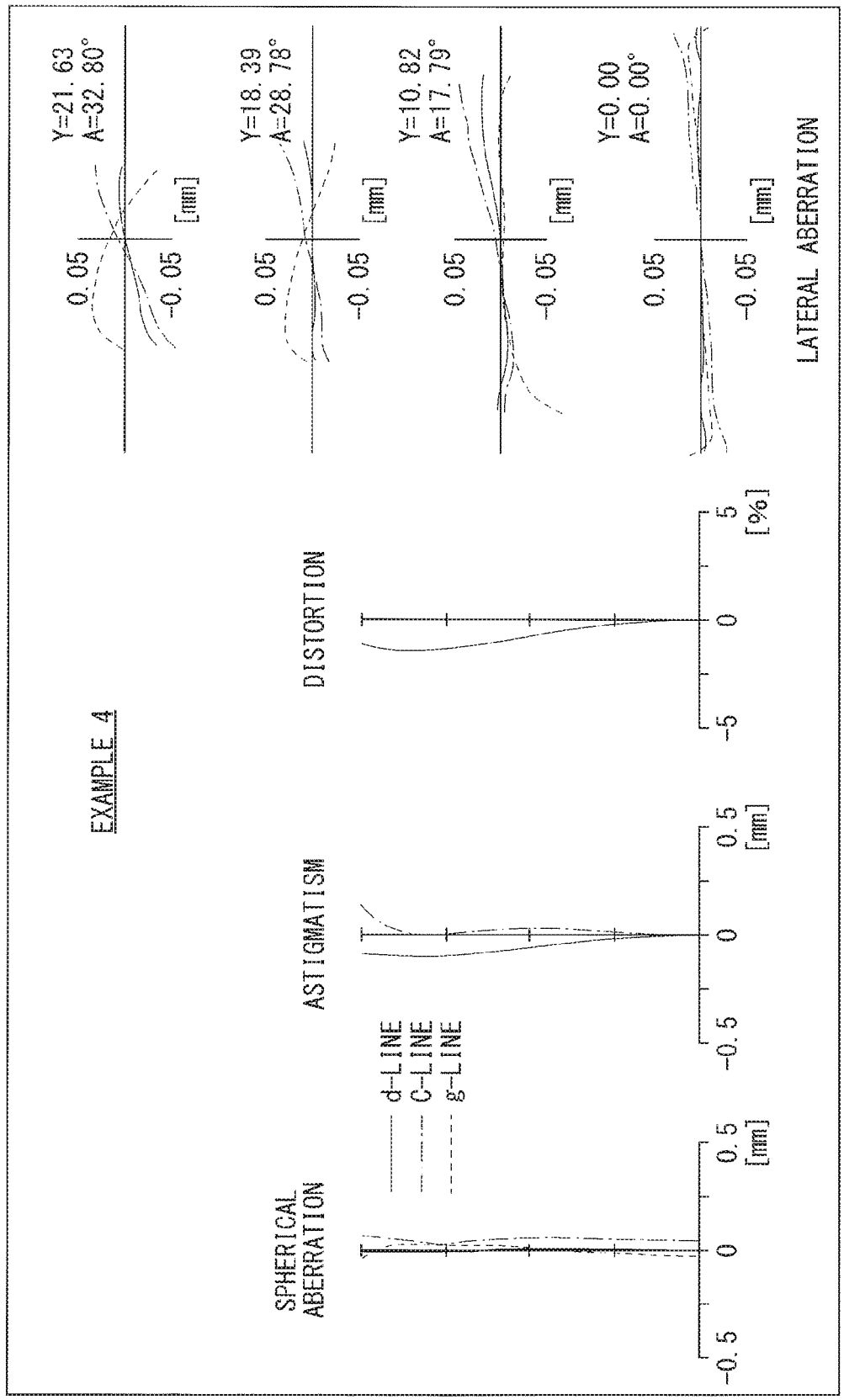
[FIG. 14]

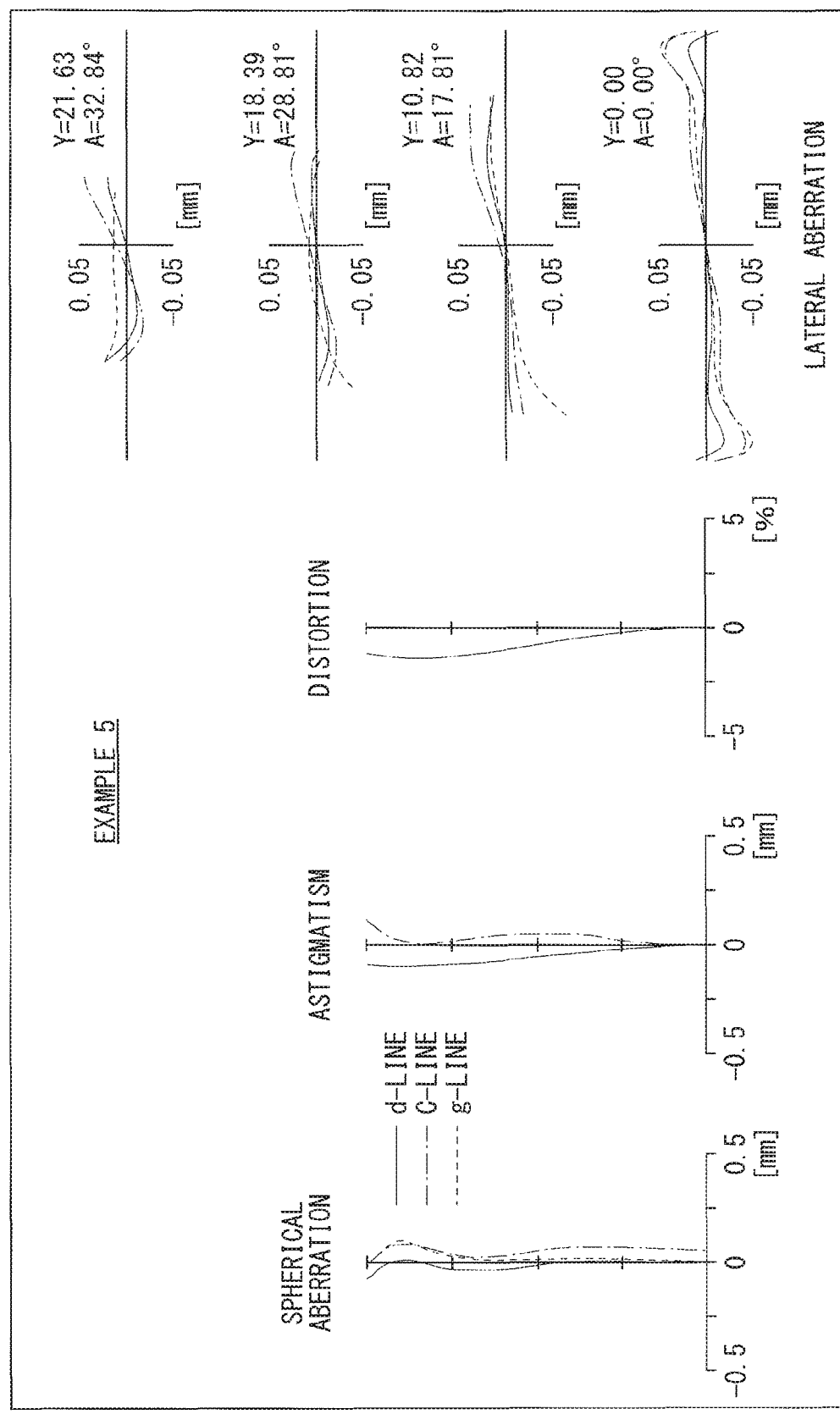

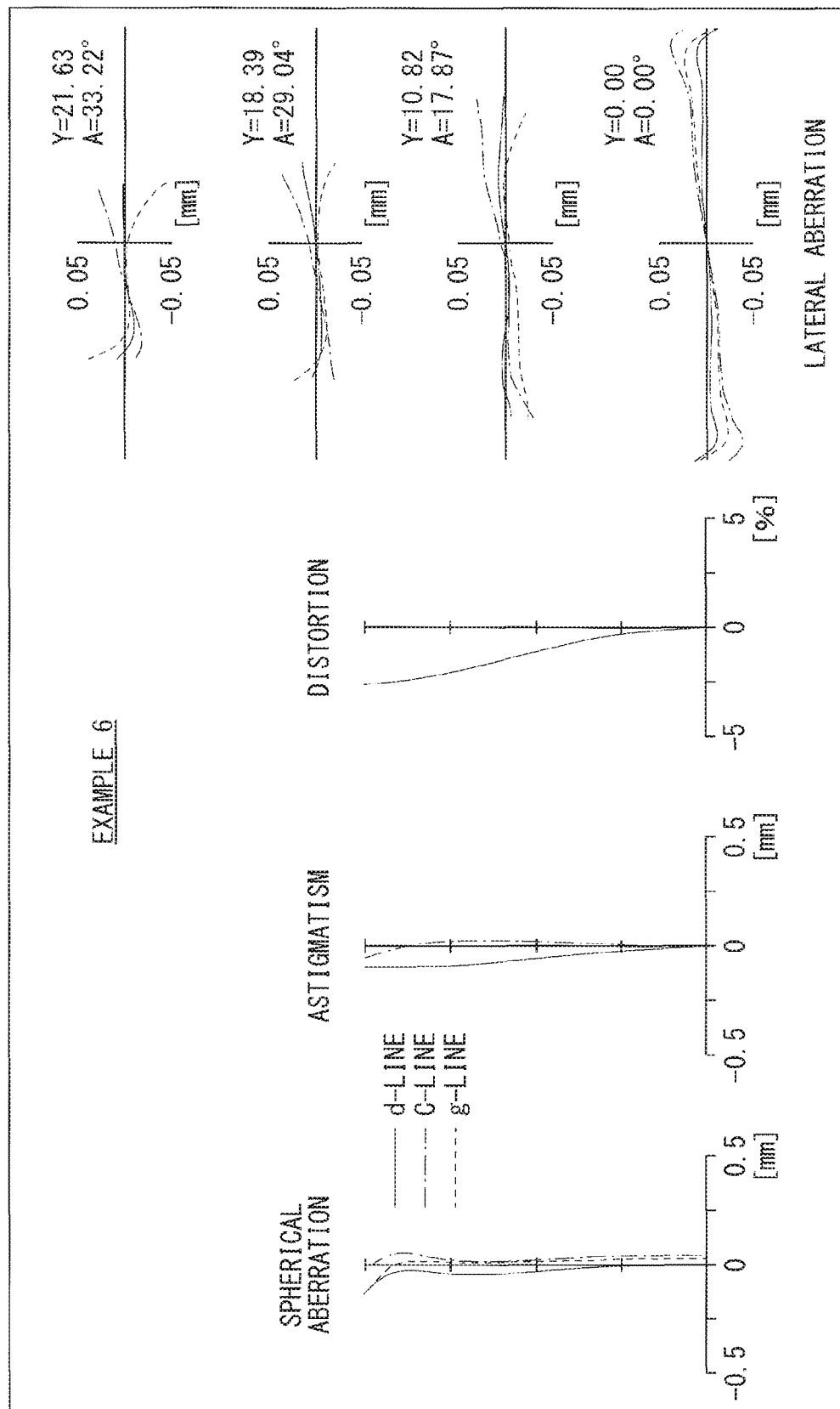

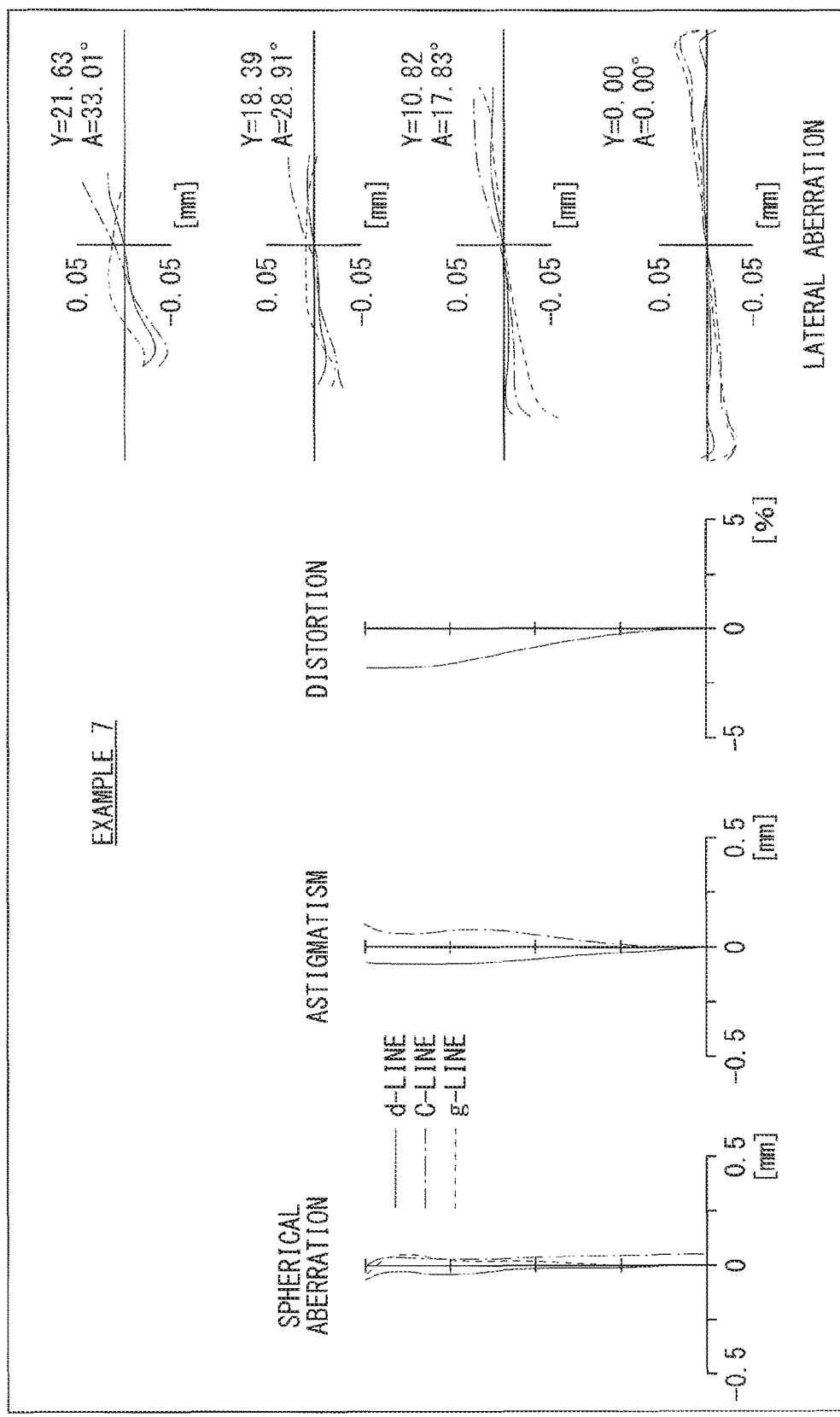

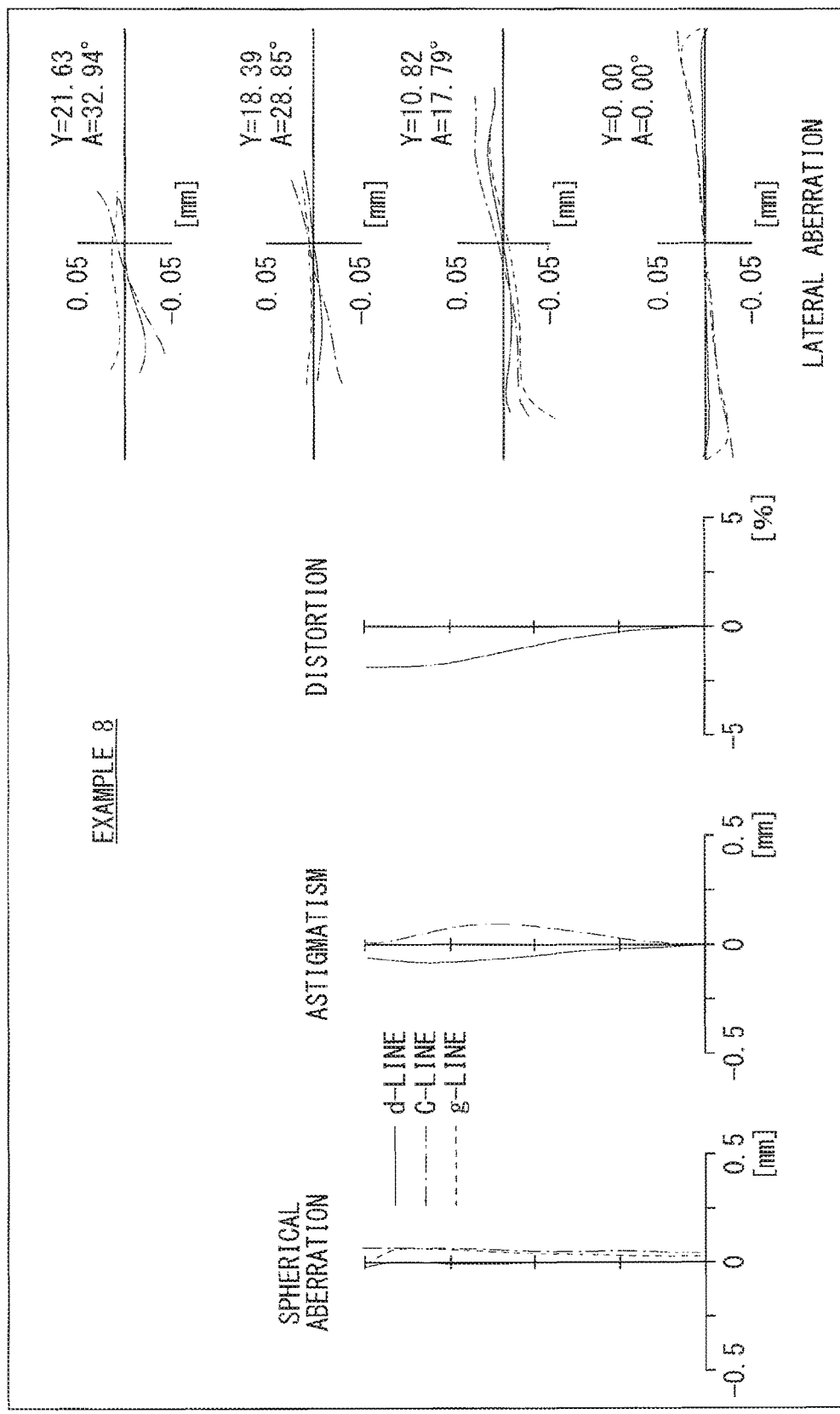

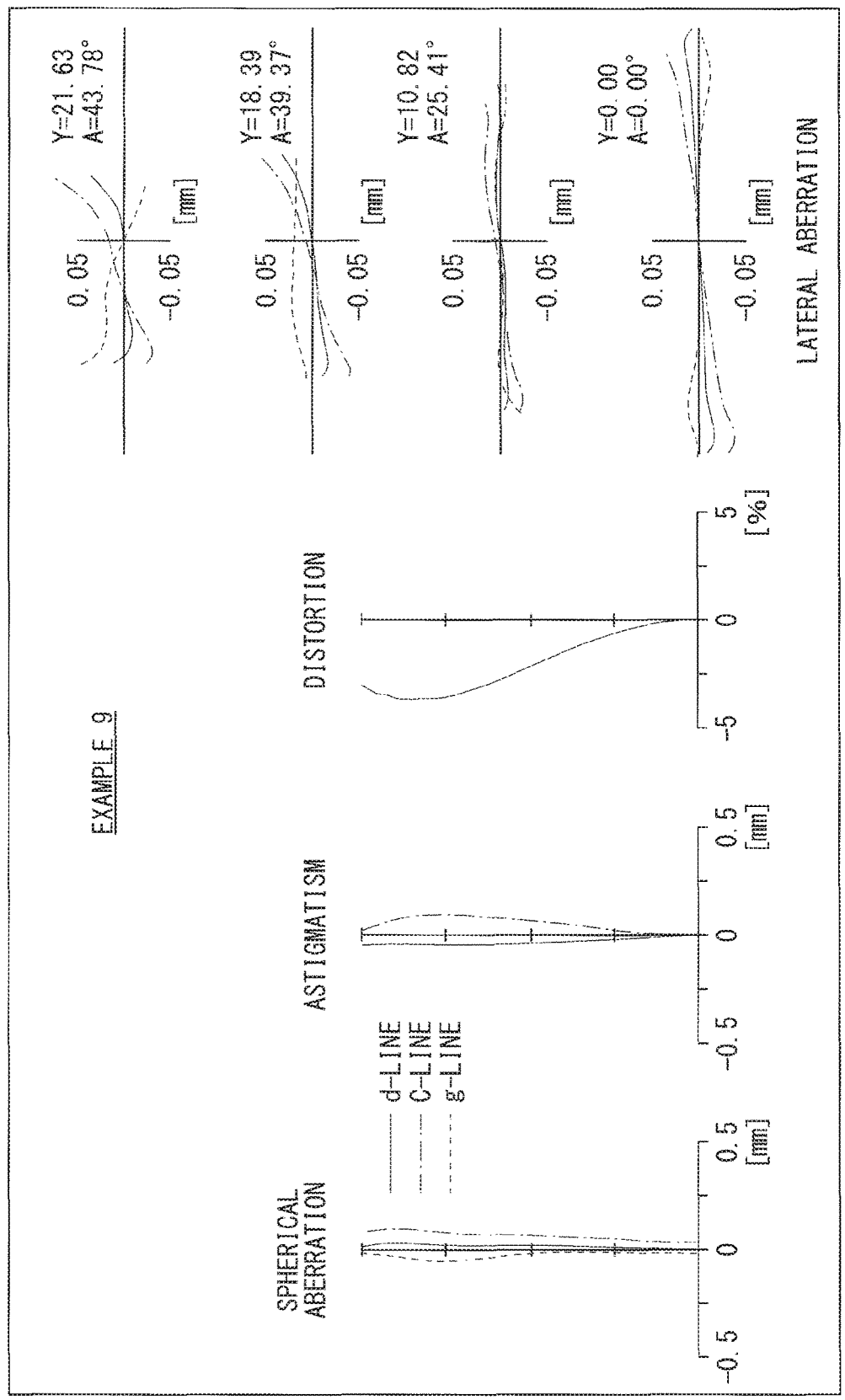

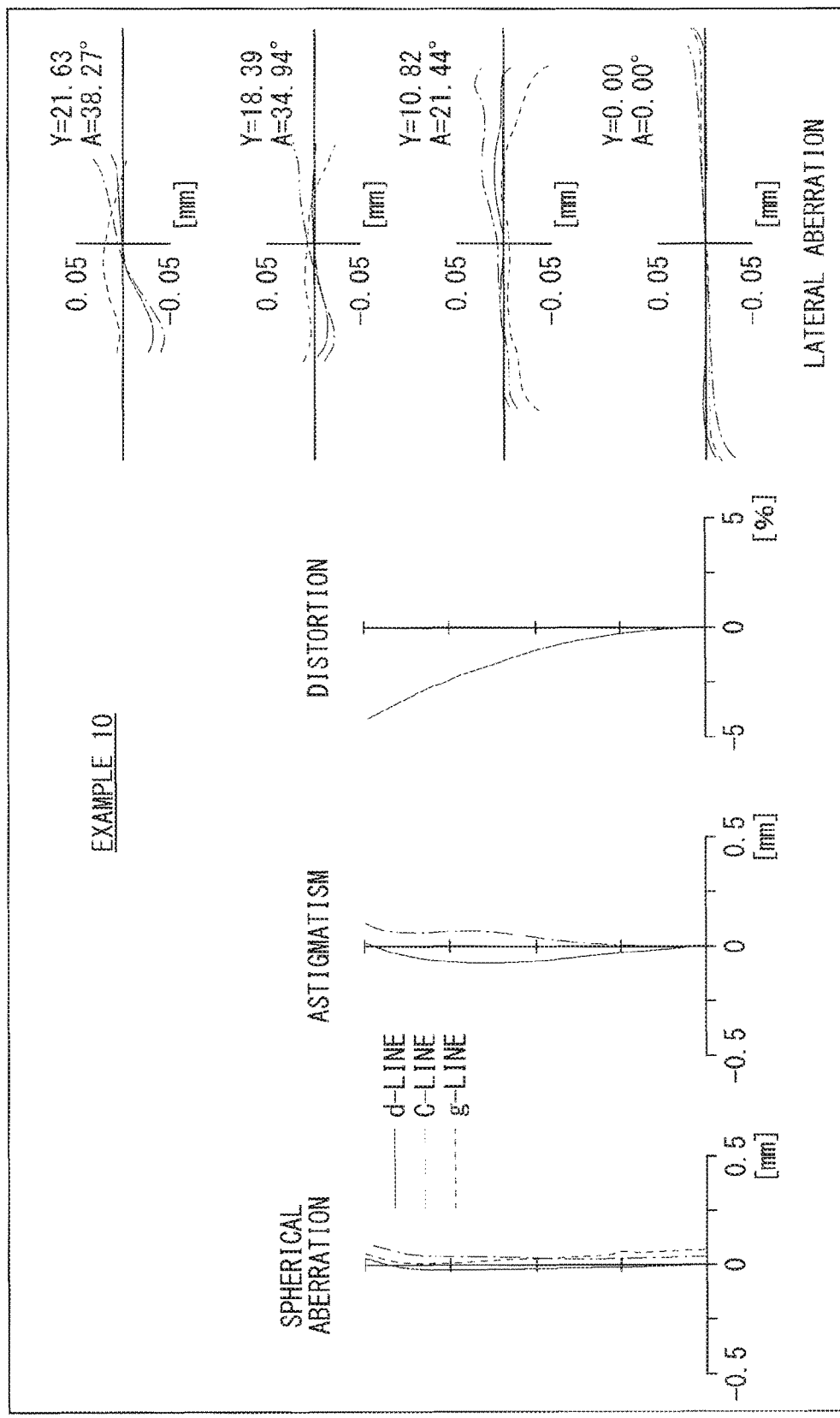

[FIG. 21]
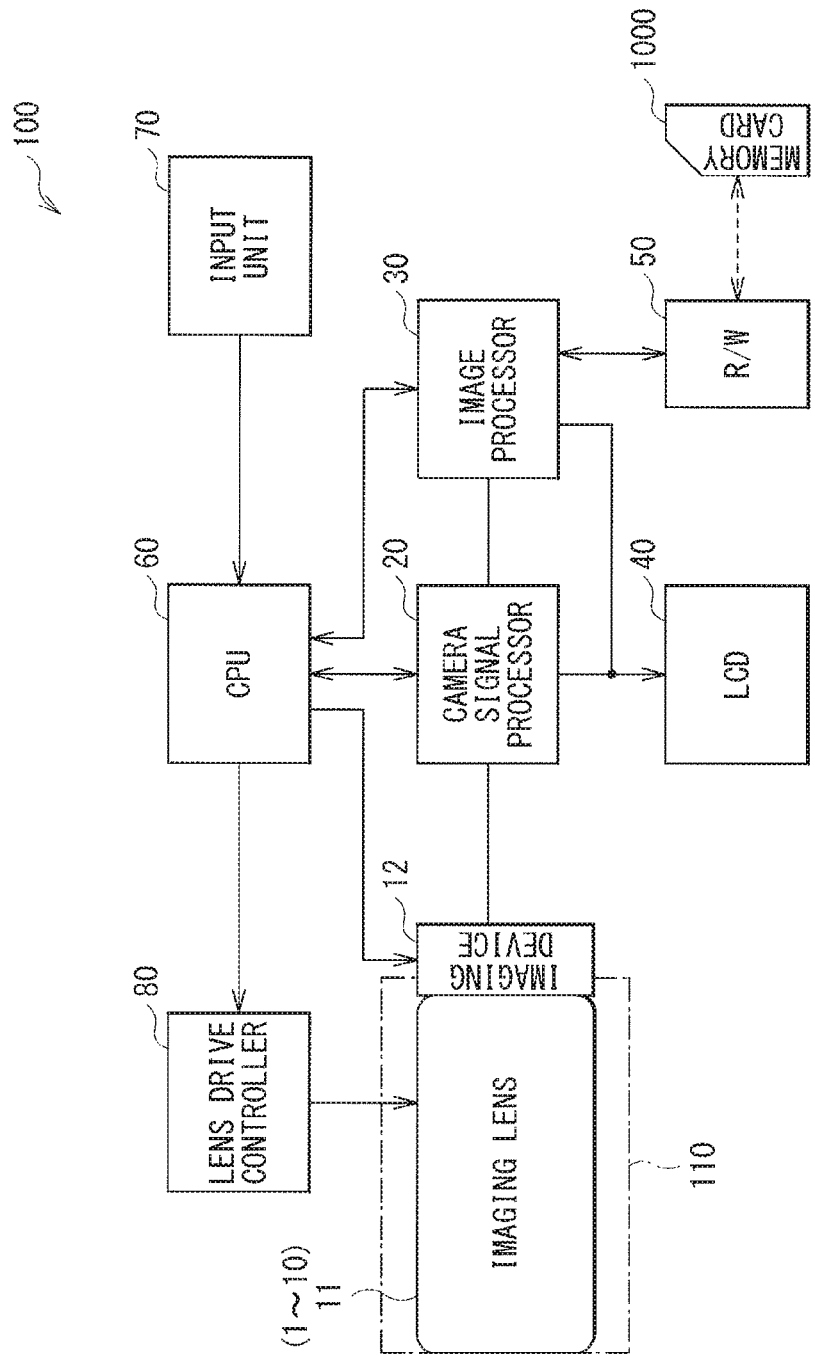

WIDE-ANGLE LENS AND IMAGING UNIT

CROSS REFERENCE TO RELATED APPLICATIONS

This application is a U.S. National Phase of International Patent Application No. PCT/JP2015/073662 filed on Aug. 24, 2015, which claims priority benefit of Japanese Patent Application No. JP 2014-207959 filed in the Japan Patent Office on Oct. 9, 2014. Each of the above-referenced applications is hereby incorporated herein by reference in its entirety.

TECHNICAL FIELD

The disclosure relates to a wide-angle lens and an imaging unit with a wide-angle lens. In more detail, the disclosure relates to a wide-angle lens that adopts an inner focusing system and has a large aperture. Such a wide-angle lens may be suitable for a single-lens reflex camera or a video camera, for example. The disclosure also relates to an imaging unit with such a wide-angle lens.

BACKGROUND ART

As a wide-angle lens having a large aperture that may be used, for example, for a photographic camera or a video camera, a number of retrofocus wide-angle lenses have been proposed in order to achieve long back focus.

CITATION LIST

Patent Literature

PTL 1: Japanese Unexamined Patent Application Publication No. 2010-097207
PTL 2: Japanese Unexamined Patent Application Publication No. 2013-257395

SUMMARY OF INVENTION

In general, a retrofocus lens has a configuration in which a lens group having negative refractive power is disposed on front side of an aperture stop and a lens group having positive refractive power is disposed on rear side of the aperture stop. In general, the retrofocus lens is of an asymmetric lens type as a whole. It has been therefore difficult to correct various types of aberration such as distortion, astigmatism, and spherical aberration when an attempt is made to shorten the lens system while securing necessary back focus.

Moreover, there have been proposed a number of retrofocus lenses that use a system such as a rear focusing system and a floating system when a subject distance is varied from infinite to proximity (for example, reference is made to PTL 1 and PTL 2). In general, aberration variations are large upon variation in subject distance to the proximity in a lens type using a system such as the rear focusing system and the floating system. Moreover, a system such as the rear focusing system and the floating system has been unsuitable for prompt autofocusing because the number of lenses that travel upon focusing is large. In recent years, an optical system used for an imaging apparatus such as a single-lens reflex camera may be strongly required to have high performance and achieve prompt autofocusing, for example.

However, an example disclosed in PTL 1 involves great variations, for example, in spherical aberration and astigmatism upon variation in subject distance from infinite to proximity, and cannot be said to have sufficient optical performance. Moreover, each of Examples 1 and 3 adopts the floating system as the focusing system, and Example 2 adopts the rear focusing system as the focusing system. Seven lenses are used upon focusing. They are therefore not suitable for prompt autofocusing.

An example disclosed in PTL 2 adopts an inner focusing system as a focusing system, which achieves reduction in weight and is suitable for prompt autofocusing. However, negative distortion is large, and optical performance is insufficient.

Accordingly, it is desirable to provide a wide-angle lens of an inner focusing system that has favorable image formation performance in a range of distance from infinite to proximity, and to provide an imaging unit provided with such a wide-angle lens.

A wide-angle lens according to one embodiment of the disclosure includes a first lens group, an aperture stop, a second lens group, and a third lens group. The first lens group has positive refractive power. The second lens group has negative refractive power. The third lens group has positive refractive power. The first lens group, the aperture stop, the second lens group, and the third lens group are disposed in order from the object side toward image side. Focusing is performed through causing the second lens group to travel toward the image side upon variation in subject distance from infinite to proximity. The first lens group includes a negative lens and at least one cemented lens. The negative lens is disposed on most-object side and has a convex surface facing the object side. The following conditional expression is satisfied, $$0.5 < f1/f < 1.0 \tag{1}$$

where f1 is a focal distance of the first lens group in a condition that the infinite is in focus, and f is a focal distance of a whole system in the condition that the infinite is in focus.

A wide-angle lens according to another embodiment of the disclosure includes a first lens group, an aperture stop, a second lens group, and a third lens group. The first lens group has positive refractive power. The second lens group has negative refractive power. The third lens group has positive refractive power. The first lens group, the aperture stop, the second lens group, and the third lens group are disposed in order from the object side toward image side. Focusing is performed through causing the second lens group to travel toward the image side upon variation in subject distance from infinite to proximity. The first lens group includes a negative lens and at least one aspheric lens. The negative lens is disposed on most-object side and has a convex surface facing the object side.

An imaging unit according to one embodiment of the disclosure includes the wide-angle lens according to the first point of view of the disclosure described above.

An imaging unit according to another embodiment of the disclosure includes the wide-angle lens according to the second point of view of the disclosure described above.

In the wide-angle lens or the imaging unit according to any of the embodiments of the disclosure, the second lens group travels toward the image side upon the variation in subject distance from the infinite to the proximity. A configuration of each of the first to third lens groups is optimized in order to achieve favorable image formation performance in a range of distance from the infinite to the proximity.

According to the wide-angle lens or the imaging unit according to any of the embodiments of the disclosure, an inner focusing system is adopted in which focusing is performed through causing the second lens group to travel toward the image side upon the variation in subject distance from the infinite to the proximity. Further, the configuration of each of the first to third lens groups is optimized. It is therefore possible to achieve favorable image formation performance in a range of distance from the infinite to the proximity.

It is to be noted that the effects described above are not necessarily limited. Any of effects described in the present disclosure may be provided.

BRIEF DESCRIPTION OF DRAWINGS

FIG. 1 is a lens cross-sectional view of a first configuration example of a wide-angle lens according to one embodiment of the disclosure.

FIG. 2 is a lens cross-sectional view of a second configuration example of the wide-angle lens.

FIG. 3 is a lens cross-sectional view of a third configuration example of the wide-angle lens.

FIG. 4 is a lens cross-sectional view of a fourth configuration example of the wide-angle lens.

FIG. 5 is a lens cross-sectional view of a fifth configuration example of the wide-angle lens.

FIG. 6 is a lens cross-sectional view of a sixth configuration example of the wide-angle lens.

FIG. 7 is a lens cross-sectional view of a seventh configuration example of the wide-angle lens.

FIG. 8 is a lens cross-sectional view of an eighth configuration example of the wide-angle lens.

FIG. 9 is a lens cross-sectional view of a ninth configuration example of the wide-angle lens.

FIG. 10 is a lens cross-sectional view of a tenth configuration example of the wide-angle lens.

FIG. 11 is an aberration diagram illustrating various types of aberration in Numerical Example 1 in which specific numeral values are applied to the wide-angle lens illustrated in FIG. 1.

FIG. 12 is an aberration diagram illustrating various types of aberration in Numerical Example 2 in which specific numeral values are applied to the wide-angle lens illustrated in FIG. 2.

FIG. 13 is an aberration diagram illustrating various types of aberration in Numerical Example 3 in which specific numeral values are applied to the wide-angle lens illustrated in FIG. 3.

FIG. 14 is an aberration diagram illustrating various types of aberration in Numerical Example 4 in which specific numeral values are applied to the wide-angle lens illustrated in FIG. 4.

FIG. 15 is an aberration diagram illustrating various types of aberration in Numerical Example 5 in which specific numeral values are applied to the wide-angle lens illustrated in FIG. 5.

FIG. 16 is an aberration diagram illustrating various types of aberration in Numerical Example 6 in which specific numeral values are applied to the wide-angle lens illustrated in FIG. 6.

FIG. 17 is an aberration diagram illustrating various types of aberration in Numerical Example 7 in which specific numeral values are applied to the wide-angle lens illustrated in FIG. 7.

FIG. 18 is an aberration diagram illustrating various types of aberration in Numerical Example 8 in which specific numeral values are applied to the wide-angle lens illustrated in FIG. 8.

FIG. 19 is an aberration diagram illustrating various types of aberration in Numerical Example 9 in which specific numeral values are applied to the wide-angle lens illustrated in FIG. 9.

FIG. 20 is an aberration diagram illustrating various types of aberration in Numerical Example 10 in which specific numeral values are applied to the wide-angle lens illustrated in FIG. 10.

FIG. 21 is a block diagram illustrating a configuration example of an imaging unit.

MODES FOR CARRYING OUT THE INVENTION

Some embodiments of the disclosure are described below in detail with reference to the drawings. It is to be noted that the description is given in the following order.
1. Basic Configuration of Lens
2. Workings and Effects
3. Example of Application to Imaging Unit
4. Numerical Examples of Lens
5. Other Embodiments 1. Basic Configuration of Lens FIG. 1 illustrates a first configuration example of a wide-angle lens according to one embodiment of the disclosure. This first configuration example corresponds to a lens configuration of Numerical Example 1 which will be described later. Similarly, FIGS. 2 to 10 illustrate cross-sectional configurations of second to tenth configuration examples corresponding to lens configurations of Numerical Examples 2 to 10, respectively. In FIG. 1 and other diagrams, Z1 indicates an optical axis. An optical member such as a cover glass CG for imaging device protection and various optical filters may be disposed between the wide-angle lens and an image plane IP.

A configuration of the wide-angle lens according to the present embodiment is described below in correspondence with the configuration examples described in FIG. 1 and other diagrams where appropriate. However, the technology according to the disclosure is not limited to the illustrated configuration examples.

The wide-angle lens according to the present embodiment has a configuration substantially including three lens groups, in which a first lens group G1, an aperture stop S, a second lens group G2, and a third lens group G3 are disposed in order along the optical axis Z1 from object side, as illustrated in FIG. 1 and other diagrams. The first lens group G1 has positive refractive power. The second lens group G2 has negative refractive power. The third lens group G3 has positive refractive power.

The wide-angle lens according to the present embodiment causes the second lens group G2 to travel, as a focus lens group, toward image side along the optical axis Z1 upon focusing in which a subject distance is varied from infinite to proximity.

The first lens group G1 may preferably include a negative lens and at least one cemented lens. The negative lens is disposed on most-object side and has a convex surface facing the object side.

The first lens group G1 may preferably include a front lens group G1F and a rear lens group G1R that are disposed in order from the object side with a maximum lens spacing in between on the optical axis Z1. The front lens group G1F may have negative refractive power. The rear lens group G1R may have positive refractive power.

Further, the first lens group G1 may preferably include at least one aspheric surface.

Other than those described above, the wide-angle lens according to the present embodiment may preferably satisfy predetermined conditional expressions, etc. that will be described later.

2. Workings and Effects

Next, workings and effects of the wide-angle lens according to the present embodiment are described. A preferable configuration of the wide-angle lens according to the present embodiment is also described together.

It is to be noted that the effects described herein are mere examples and are not limited. Further, other effect may be provided.

According to the wide-angle lens of the present embodiment, an inner focusing system is adopted, and the configuration of each of the first to third lens groups is optimized. It is therefore possible to achieve favorable image formation performance in a range of distance from the infinite to the proximity.

In the wide-angle lens according to the present embodiment, the inner focusing system is adopted in which the first lens group G1 and the third lens group G3 are fixed with respect to the image plane IP and the second lens group G2 travels toward the image side when the subject distance is varied from the infinite to the proximity. This makes it possible to reduce weight of the focus lens group and to be suitable for prompt autofocusing.

The first lens group G1 may preferably include, on the most-object side, the negative lens having the convex surface facing the object side in order to ensure both an angle of view of a wide angle and the back focus. Disposing a lens having positive refractive power on the most-object side may be preferable for correction of distortion. However, disposing the lens having positive refractive power on the most-object side results in an increase in maximum aperture, and is therefore not preferable.

A positive lens having a relatively-large thickness may be preferably disposed in the vicinity on the object side of the aperture stop S in order to favorably correct the distortion. Further, disposing at least one cemented lens in a rear part in the first lens group G1 makes it possible to favorably correct chromatic aberration.

Moreover, disposing at least one aspheric lens in the first lens group G1 makes it possible to favorably correct, for example, distortion and field curvature.

It may be preferable that the wide-angle lens according to the present embodiment satisfy the following conditional expression (1), $$0.5 < f1/f < 1.0 \tag{1}$$

where "f1" is a focal distance of the first lens group G1 in a condition that the infinite is in focus, and "f" is a focal distance of the whole system in the condition that the infinite is in focus.

The conditional expression (1) defines a ratio of the focal distance of the whole system in the condition that the infinite is in focus with respect to the focal distance of the first lens group G1 in the condition that the infinite is in focus. Satisfying the conditional expression (1) makes it possible to preferably correct, for example, spherical aberration and coma aberration that occur in the first lens group G1. When a value of f1/f is smaller than the lower limit of the conditional expression (1), the refractive power of the first lens group G1 increases. This makes it difficult to correct, for example, the spherical aberration or the coma aberration that occurs in the first lens group G1. When the value of f1/f is greater than the upper limit of the conditional expression (1), the refractive power of the first lens group G1 decreases. This results in an increase in size of the optical system. It is therefore not preferable that the value of f1/f is greater than the upper limit of the conditional expression (1). In order to avoid the increase in size of the optical system, it is necessary to increase the refractive power of the third lens group G3. This may make it difficult to correct, for example, spherical aberration or coma aberration that occurs in the third lens group G3.

It is to be noted that a range of a numerical value of the conditional expression (1) may be preferably set as a range of the following conditional expression (1)' in order to further achieve the foregoing effect.

$$0.7 < f1/f < 1.0 \tag{1'}$$

Moreover, it may be preferable that the wide-angle lens according to the present embodiment satisfy the following conditional expression (2), $$0.9 \le f1R/f1 < 1.5 \tag{2}$$

where "f1R" is a focal distance of the rear lens group G1R in the condition that the infinite is in focus.

The front lens group G1F serves as a wide converter in the first lens group G1. The refractive power of the first lens group G1 is determined depending on the rear lens group G1R. The conditional expression (2) defines a ratio of the focal distance of the first lens group G1 in the condition that the infinite is in focus with respect to the focal distance of the rear lens group G1R in the condition that the infinite is in focus. Satisfying the conditional expression (2) allows the refractive power of the first lens group G1 to be appropriate. This makes it possible to suppress aberration variations due to the focusing while securing favorable focusing sensitivity of the second lens group G2 that travels upon the focusing. When a value of f1R/f1 is smaller than the lower limit of the conditional expression (2), the refractive power of the first lens group G1 increases, which makes it necessary to increase the negative refractive power of the second lens group G2. This results in an increase in aberration variations upon the focusing. When the value of f1R/f1 is greater than the upper limit of the conditional expression (2), the refractive power of the first lens group G1 decreases, which prevents the negative refractive power of the second lens group G2 from increasing. In other words, it is not preferable that the value of f1R/f1 is greater than the upper limit of the conditional expression (2), because the focusing sensitivity decreases, a traveling amount upon the focusing increases, and the optical system increases in size.

It is to be noted that a range of a numerical value of the conditional expression (2) may be preferably set as a range of the following conditional expression (2)' in order to further achieve the foregoing effect.

$$0.9 \le f1R/f1 < 1.3 \tag{2'}$$

Moreover, it may be preferable that the wide-angle lens according to the present embodiment satisfy the following conditional expression (3), $$-1.0 < f2/f3 < -0.5 \tag{3}$$

where "f2" is a focal distance of the second lens group G2 in the condition that the infinite is in focus, and "f3" is a focal distance of the third lens group G3 in the condition that the infinite is in focus.

The conditional expression (3) defines a ratio of the focal distance of the third lens group G3 in the condition that the infinite is in focus with respect to the focal distance of the second lens group G2 in the condition that the infinite is in focus. Satisfying the conditional expression (3) allows the refractive power of the third lens group G3 to be appropriate. This makes it possible to suppress, for example, variation in spherical aberration or coma aberration due to the focusing. When a value of f2/f3 is smaller than the lower limit of the conditional expression (3), the refractive power of the second lens group G2 increases. This makes it difficult to correct the spherical aberration upon the focusing. When the value of f2/f3 is greater than the upper limit of the conditional expression (3), the refractive power of the third lens group G3 increases. This makes it difficult to correct coma aberration that occurs in the third lens group G3.

It is to be noted that a range of a numerical value of the conditional expression (3) may be preferably set as a range of the following conditional expression (3)' in order to further achieve the foregoing effect.

$$-1.0 < f2/f3 < -0.7 \tag{3}'$$

3. Example of Application to Imaging Unit

FIG. 21 illustrates a configuration example of an imaging unit 100 to which the wide-angle lens according to the present embodiment is applied. This imaging unit 100 may be a digital still camera, for example. The imaging unit 100 may include a camera block 110, a camera signal processor 20, an image processor 30, a liquid crystal display (LCD) 40, a reader-writer (a R/W) 50, a central processing unit (CPU) 60, an input unit 70, and a lens drive controller 80.

The camera block 110 has an imaging function. The camera block 110 includes an optical system and an imaging device 12. The optical system may include an imaging lens 11. The imaging device 12 may be charge coupled devices (CCD) or a complementary metal oxide semiconductor (CMOS), for example. The imaging device 12 converts an optical image formed by the imaging lens 11 into an electric signal, thereby outputting an imaging signal (an image signal) in accordance with the optical image. Any of wide-angle lenses 1 to 10 of the respective configuration examples illustrated in FIGS. 1 to 10 may be applicable as the imaging lens 11.

The camera signal processor 20 may perform, on the image signal supplied from the imaging device 12, various signal processes such as analog-to-digital conversion, denoising, image quality correction, and conversion to luminance and color-difference signal.

The image processor 30 performs a recording and reproducing process of the image signal. The image processor 30 performs a process such as compression encoding and expansion decoding of the image signal based on a predetermined image data format and conversion process of data specifications such as resolution.

The LCD 40 has a function of displaying various types of data including, for example, an operation state of a user with respect to the input unit 70 and photographed images. The R/W 50 writes, on a memory card 1000, image data that has been encoded by the image processor 30 and reads the image data stored in the memory card 1000. The memory card 1000 may be a semiconductor memory attachable to and detachable from a slot coupled to the R/W 50, for example.

The CPU 60 serves as a control processor that controls each circuit block provided in the imaging unit 100. The CPU 60 controls each circuit block on the basis of, for example, an instruction input signal from the input unit 70. The input unit 70 may include, for example, various switches by which a necessary operation is performed by the user. The input unit 70 may include, for example, a shutter release button directed to performing a shutter operation, a selection switch directed to selecting an operation mode. The input unit 70 supplies, to the CPU 60, the instruction input signal in accordance with the operation performed by the user. The lens drive controller 80 controls driving of lenses disposed in the camera block 110. The lens drive controller 80 may control, for example, an unillustrated motor that drives each lens in the imaging lens 11 on the basis of a control signal from the CPU 60.

An operations of the imaging unit 100 is described below.

In a standby state for shooting, under the control by the CPU 60, the image signal of an image shot by the camera block 110 is supplied to the LCD 40 via the camera signal processor 20 to be displayed as a camera-through image. Further, for example, when the instruction input signal for focusing is supplied from the input unit 70, the CPU 60 supplies the control signal to the lens drive controller 80, and a predetermined lens in the imaging lens 11 travels on the basis of the control by the lens drive controller 80.

When an unillustrated shutter in the camera block 110 operates in response to the instruction input signal from the input unit 70, the image signal of the shot image is supplied from the camera signal processor 20 to the image processor 30. The image processor 30 performs compression encoding on the supplied image signal and thereby converts the image signal into digital data having a predetermined data format. The data that has been subjected to the conversion is supplied to the R/W 50. The data supplied to the R/W 50 is written on the memory card 1000.

It is to be noted that focusing may be performed, for example, through causing the lens drive controller 80 to cause the predetermined lens in the imaging lens 11 to travel on the basis of the control signal from the CPU 60, for example, when the shutter release button of the input unit 70 is pressed halfway or when the shutter release button is fully pressed for recording (shooting).

Upon reproducing the image data recorded in the memory card 1000, the R/W 50 reads out the predetermined image data from the memory card 1000 in response to the operation performed on the input unit 70. The image processor 30 performs extension decoding on the read image data. Thereafter, a reproduction image signal is supplied to the LCD 40. A reproduction image is thereby displayed.

It is to be noted that, although the example in which the imaging unit is applied to a digital still camera is described above for the present embodiment, a range of application of the imaging unit is not limited to a digital still camera, and the imaging unit is applicable to other various imaging units. For example, possible applications of the imaging unit may include a digital single-lens reflex camera, a digital non-reflex camera, and a digital video camera. Moreover, the imaging unit may be widely applicable, for example, as a camera unit of a mobile phone with a built-in camera or a digital input and output apparatus such as an information terminal with a built-in camera. Moreover, the imaging unit may be also applicable to a camera with an interchangeable lens.

EXAMPLES

4. Numerical Examples of Lens

Next, description is given of specific numerical examples of the wide-angle lens according to the present embodiment.

The description is given below of numerical examples in which specific numerical values are applied to the wide-angle lenses 1 to 10 having the respective configuration examples illustrated in FIGS. 1 to 10, respectively.

It is to be noted that symbols in the following tables and the description below represent the following. "Surface No." represents the number of the i-th surface when the surface is counted from the object side toward the image side. "Ri" represents a value (mm) of a paraxial radius of curvature of the i-th surface. "Di" represents a value (mm) of a spacing (the thickness of the center of the lens or air spacing) on the optical axis between the i-th surface and the (i+1)th surface. "Ndi" represents a value of a refractive index of the d-line (having the wavelength of 587.6 nm) of, for example, a lens that firstly includes the i-th surface. "vdi" represents a value of an Abbe number of the d-line that firstly includes the i-th surface. A part having "INF" for the value of "Ri" represents a flat surface or an aperture stop surface (the aperture stop S). A surface having "STO" for "Surface No." represents the aperture stop S. "f" represents a focal distance of the whole lens system, "Fno" represents an F-number (a full-aperture F number), "BF" represents back focus, and "ω" represents a half angle of view.

Some of the lenses used in the respective numerical examples include an aspheric lens surface. A surface having "ASP" for "Surface No." represents an aspheric surface. The shape of the aspheric surface is defined by the following expression of the aspheric surface. It is to be noted that, in the respective tables describing aspheric surface coefficients that will be described later, "E-n" is an exponential expression having 10 as a base, i.e., "E-n" represents "the –n-th power of 10 ($10^{-n}$)". For example, "0.12345E-05" represents "$0.12345 \times 10^{-5}$".

$$x = c^2 y^2 / [1 + \{1 - (1+K) c^2 y^2\}^{1/2}] + \Sigma A_i \cdot y^i \quad \text{(Expression of Asphoric Surface)}$$

In the foregoing expression, "x" is a sag amount (a distance along the optical axis from a vertex of the lens surface), "y" is a height in a direction perpendicular to the optical axis, "c" is a paraxial curvature at the vertex of the lens (a reciprocal of the paraxial radius of curvature R), "K" is a conic constant, and "Ai" is the i-th aspheric surface coefficient.

Configuration Common to Respective Numerical Examples

Each of the wide-angle lenses 1 to 10 to which the following numerical examples are applied has the foregoing basic configuration of the lens and has a configuration that satisfies the preferable conditions. Specifically, each of the wide-angle lenses 1 to 10 has a configuration substantially including three lens groups, in which the first lens group G1 having the positive refractive power, the aperture stop S, the second lens group G2 having the negative refractive power, and the third lens group G3 having the positive refractive power are disposed in order from the object side.

Each of the wide-angle lenses 1 to 10 causes the second lens group G2 to travel, as the focus lens group, toward the image side along the optical axis Z1 upon focusing in which the subject distance is varied from the infinite to the proximity.

The first lens group G1 includes the front lens group G1F having the negative refractive power and the rear lens group G1R having the positive refractive power that are disposed in order from the object side with the maximum lens spacing in between on the optical axis Z1.

Numerical Example 1

Table 1 describes lens data of Numerical Example 1 in which specific numerical values are applied to the wide-angle lens 1 illustrated in FIG. 1.

TABLE 1

Example 1

| Lens group | Surface No. | Ri | Di | Ndi | vdi |
|---|---|---|---|---|---|
| G1 | 1 | 111.131 | 1.500 | 1.557520 | 66.1 |
|  | 2 | 31.112 | 29.171 |  |  |
|  | 3 | −32.453 | 3.187 | 1.890200 | 22.0 |
|  | 4 | −59.353 | 0.300 |  |  |
|  | 5 | −8053.913 | 6.194 | 1.772500 | 49.6 |
|  | 6 | −44.048 | 0.300 |  |  |
|  | 7 | 35.958 | 1.500 | 1.921190 | 24.0 |
|  | 8 | 22.406 | 9.895 | 1.851350 | 40.1 |
|  | 9(ASP) | −1263.080 | 3.000 |  |  |
|  | 10(STO) | INF | 3.374 |  |  |
| G2 | 11 (ASP) | 411.724 | 1.000 | 1.622625 | 58.2 |
|  | 12 | 24.523 | 12.763 |  |  |
| G3 | 13(ASP) | 50.610 | 7.297 | 1.618806 | 63.9 |
|  | 14(ASP) | −35.763 | 7.000 |  |  |
|  | 15 | −37.682 | 2.583 | 1.592820 | 68.6 |
|  | 16 | −28.135 | 4.883 |  |  |
|  | 17 | −20.549 | 1.200 | 1.945945 | 18.0 |
|  | 18 | −41.754 | 11.352 |  |  |
|  | 19 | INF | 2.500 | 1.516798 | 64.2 |
|  | 20 | INF | — |  |  |

In the wide-angle lens 1 illustrated in FIG. 1, the front lens group G1F includes a first lens (a negative lens) L1 that has a convex shape on the object side and has negative refractive power. The rear lens group G1R includes a second lens L2, a third lens L3, and a cemented lens including a fourth lens L4 and a fifth lens L5 that are cemented together. The second lens L2 has a concave shape on the object side and has negative refractive power. The third lens L3 has a convex shape on the image side and has positive refractive power. The fourth lens L4 has a convex shape on the object side and has negative refractive power. The fifth lens L5 is disposed on the image side of the fourth lens L4. The fifth lens L5 has a convex shape on the object side and has positive refractive power.

The second lens group G2 includes a sixth lens L6 that has a convex shape on the object side and has negative refractive power.

The third lens group G3 includes a seventh lens L7, an eighth lens L8, and a ninth lens L9. The seventh lens L7 has a biconvex shape and has positive refractive power. The eighth lens L8 has a convex shape on the image side and has positive refractive power. The ninth lens L9 has a convex shape on the image side and has negative refractive power.

The image plane IP is disposed on the image side of the third lens group G3. The cover glass CG is disposed between the third lens group G3 and the image plane IP.

In this wide-angle lens 1, an aspheric surface is formed on each of an image-sided surface (a ninth surface) of the fifth lens L5 in the first lens group G1, an object-sided surface (an eleventh surface) of the sixth lens L6 in the second lens group G2, and an object-sided surface (a thirteenth surface) and an image-sided surface (a fourteenth surface) of the seventh lens L7 in the third lens group G3. Values of the fourth, sixth, eighth, and tenth aspheric surface coefficients A4, A6, A8, and A10 in the foregoing aspheric surfaces are described in Table 2 together with the values of the conic constant K.

Further, Table 3 describes the values of the focal distance f of the whole lens system, the F-number Fno, the back focus BF, and the half angle of view ω.

TABLE 2

Example 1

| Surface No. | K | A4 | A6 | A8 | A10 |
|---|---|---|---|---|---|
| 9 | 0.000 | 4.70E−06 | −1.34E−09 | −8.13E−13 | 0.00E+00 |
| 11 | 0.000 | −1.66E−06 | −9.87E−09 | 0.00E+00 | 0.00E+00 |
| 13 | 0.000 | 1.55E−06 | 9.81E−09 | 0.00E+00 | 0.00E+00 |
| 14 | −0.895 | −7.70E−08 | −1.10E−09 | 1.94E−11 | 0.00E+00 |

TABLE 3

Example 1

| | |
|---|---|
| f | 34.6 |
| Fno | 1.44 |
| BF | 1.000 |
| ω | 32.82 |

FIG. 11 illustrates various types of aberration in Numerical Example 1. FIG. 11 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having a wavelength of 435.84 nm) and the C-line (having a wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 1 according to Numerical Example 1, and the wide-angle lens 1 according to Numerical Example 1 obviously has superior image formation performance.

Numerical Example 2

Table 4 describes lens data of Numerical Example 2 in which specific numerical values are applied to the wide-angle lens 2 illustrated in FIG. 2.

TABLE 4

Example 2

| Lens | Surface No. | Ri | Di | Ndi | vdi |
|---|---|---|---|---|---|
| G1 | 1 | 67.850 | 1.600 | 1.487489 | 70.4 |
| | 2 | 24.654 | 8.084 | | |
| | 3 | 47.994 | 6.092 | 1.953747 | 32.3 |
| | 4 | 235.532 | 0.300 | | |
| | 5 | 93.613 | 1.400 | 1.583130 | 59.5 |
| | 6(ASP) | 27.623 | 15.676 | | |
| | 7 | −63.767 | 1.500 | 1.805181 | 25.5 |
| | 8 | 34.499 | 9.342 | 1.729160 | 54.7 |
| | 9 | −53.961 | 3.872 | | |

TABLE 4-continued

Example 2

| Lens | Surface No. | Ri | Di | Ndi | vdi |
|---|---|---|---|---|---|
| | 10(ASP) | 60.334 | 13.000 | 1.729030 | 54.0 |
| | 11 | −42.634 | 2.500 | | |
| | 12(STO) | INF | 2.796 | | |
| G2 | 13(ASP) | 1074.658 | 1.400 | 1.693500 | 53.2 |
| | 14(ASP) | 31.403 | 2.962 | | |
| | 15 | 90.880 | 2.877 | 1.945945 | 18.0 |
| | 16 | 382.975 | 10.602 | | |
| G3 | 17 | 63.374 | 5.720 | 1.882023 | 37.2 |
| | 18(ASP) | −47.285 | 0.300 | | |
| | 19 | −557.669 | 1.400 | 1.567320 | 42.8 |
| | 20 | 25.608 | 2.303 | | |
| | 21 | 43.246 | 9.479 | 1.729160 | 54.7 |
| | 22 | −22.000 | 1.450 | 1.846663 | 23.8 |
| | 23 | 70.000 | 15.845 | | |
| | 24 | INF | 2.500 | 1.516798 | 64.2 |
| | 25 | INF | — | | |

In the wide-angle lens 2 illustrated in FIG. 2, the front lens group G1F includes a first lens (a negative lens) L1, a second lens L2, and a third lens L3. The first lens L1 has a convex shape on the object side and has negative refractive power. The second lens L2 has a convex shape on the object side and has positive refractive power. The third lens L3 has a convex shape on the object side and has negative refractive power. The rear lens group G1R includes a cemented lens including a fourth lens L4 and a fifth lens L5 that are cemented together and a sixth lens L6. The fourth lens L4 has a biconcave shape and has negative refractive power. The fifth lens L5 is disposed on the image side of the fourth lens L4. The fifth lens L5 has a biconvex shape and has positive refractive power. The sixth lens L6 has a biconvex shape and has positive refractive power.

The second lens group G2 includes a seventh lens L7 and an eighth lens L8. The seventh lens L7 has a convex shape on the object side and has negative refractive power. The eighth lens L8 has a convex shape on the object side and has positive refractive power.

The third lens group G3 includes a ninth lens L9, a tenth lens L10, and a cemented lens including an eleventh lens L11 and a twelfth lens L12 that are cemented together. The ninth lens L9 has a biconvex shape and has positive refractive power. The tenth lens L10 has a convex shape on the object side and has negative refractive power. The eleventh lens L11 has a biconvex shape and has positive refractive power. The twelfth lens L12 is disposed on the image side of the eleventh lens L11. The twelfth lens L12 has a biconcave shape and has negative refractive power.

The image plane IP is disposed on the image side of the third lens group G3. The cover glass CG is disposed between the third lens group G3 and the image plane IP.

In this wide-angle lens 2, an aspheric surface is formed on each of an image-sided surface (a sixth surface) of the third lens L3 in the first lens group G1, an object-sided surface (a tenth surface) of the sixth lens L6 in the first lens group G1, an object-sided surface (a thirteenth surface) and an image-sided surface (a fourteenth surface) of the seventh lens L7 in the second lens group G2, and an image-sided surface (an eighteenth surface) of the ninth lens L9 in the third lens group G3. Values of the fourth, sixth, eighth, and tenth aspheric surface coefficients A4, A6, A8, and A10 in the foregoing aspheric surfaces are described in Table 5 together with the values of the conic constant K.

Further, Table 6 describes the values of the focal distance f of the whole lens system, the F-number Fno, the back focus BF, and the half angle of view ω.

TABLE 5

Example 2

| Surface No. | K | A4 | A6 | A8 | A10 |
|---|---|---|---|---|---|
| 6 | 0.000 | 2.37E−06 | −4.14E−09 | 3.03E−11 | −4.41E−14 |
| 10 | 0.000 | −4.25E−06 | −3.44E−09 | 5.65E−12 | 0.00E+00 |
| 13 | 0.000 | −3.33E−06 | 2.34E−08 | −8.98E−11 | 5.89E−14 |
| 14 | 0.000 | −1.80E−06 | 2.30E−08 | −1.06E−10 | 3.99E−14 |
| 18 | 0.000 | 3.34E−06 | −2.57E−09 | 1.01E−13 | 7.01E−15 |

TABLE 6

Example 2

| | |
|---|---|
| f | 34.0 |
| Fno | 1.44 |
| BF | 1.000 |
| ω | 32.68 |

FIG. 12 illustrates various types of aberration in Numerical Example 2. FIG. 12 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having the wavelength of 435.84 nm) and the C-line (having the wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 2 according to Numerical Example 2, and the wide-angle lens 2 according to Numerical Example 2 obviously has superior image formation performance.

Numerical Example 3

Table 7 describes lens data of Numerical Example 3 in which specific numerical values are applied to the wide-angle lens 3 illustrated in FIG. 3.

TABLE 7

Example 3

| Lens | Surface No. | Ri | Di | Ndi | vdi |
|---|---|---|---|---|---|
| G1 | 1 | 98.073 | 1.500 | 1.487489 | 70.4 |
| | 2 | 25.000 | 33.608 | | |
| | 3(ASP) | 109.000 | 9.526 | 1.810729 | 44.3 |
| | 4 | −32.500 | 1.500 | 1.785769 | 26.1 |
| | 5 | −72.169 | 1.870 | | |
| | 6 | −444.021 | 1.500 | 1.724027 | 28.7 |
| | 7 | 35.279 | 11.300 | 1.772500 | 49.6 |
| | 8 | −48.500 | 2.500 | | |
| | 9(STO) | INF | 2.888 | | |
| G2 | 10(ASP) | 172.038 | 1.400 | 1.693500 | 53.2 |
| | 11(ASP) | 28.000 | 3.017 | | |
| | 12 | 111.489 | 4.590 | 1.945950 | 18.0 |
| | 13 | −41.645 | 1.450 | 1.745095 | 27.4 |
| | 14 | 53.308 | 7.682 | | |
| G3 | 15 | 38.482 | 6.373 | 1.832334 | 41.6 |
| | 16(ASP) | −37.390 | 0.300 | | |
| | 17 | −74.683 | 1.400 | 1.736638 | 27.8 |
| | 18 | 27.142 | 1.997 | | |

TABLE 7-continued

Example 3

| Lens | Surface No. | Ri | Di | Ndi | vdi |
|---|---|---|---|---|---|
| | 19 | 51.143 | 8.296 | 1.812649 | 45.3 |
| | 20 | −24.100 | 1.500 | 1.846660 | 23.8 |
| | 21 | 150.000 | 16.576 | | |
| | 22 | INF | 2.500 | 1.516798 | 64.2 |
| | 23 | INF | — | | |

In the wide-angle lens 3 illustrated in FIG. 3, the front lens group G1F includes a first lens (a negative lens) L1 that has a convex shape on the object side and has negative refractive power. The rear lens group G1R includes a first cemented lens including a second lens L2 and a third lens L3 that are cemented together, and a second cemented lens including a fourth lens L4 and a fifth lens L5 that are cemented together. The second lens L2 has a biconvex shape and has positive refractive power. The third lens L3 is disposed on the image side of the second lens L2. The third lens L3 has a convex shape on the image side and has negative refractive power. The fourth lens L4 has a biconcave shape and has negative refractive power. The fifth lens L5 is disposed on the image side of the fourth lens L4. The fifth lens L5 has a biconvex shape and has positive refractive power.

The second lens group G2 includes a sixth lens L6 and a cemented lens including a seventh lens L7 and an eighth lens L8 that are cemented together. The sixth lens L6 has a convex shape on the object side and has negative refractive power. The seventh lens L7 has a biconvex shape and has positive refractive power. The eighth lens L8 is disposed on the image side of the seventh lens L7. The eighth lens L8 has a biconcave shape and has negative refractive power.

The third lens group G3 includes a ninth lens L9, a tenth lens L10, and a cemented lens including an eleventh lens L11 and a twelfth lens L12 that are cemented together. The ninth lens L9 has a biconvex shape and has positive refractive power. The tenth lens L10 has a biconcave shape and has negative refractive power. The eleventh lens L11 has a biconvex shape and has positive refractive power. The twelfth lens L12 is disposed on the image side of the eleventh lens L11. The twelfth lens L12 has a biconcave shape and has negative refractive power.

The image plane IP is disposed on the image side of the third lens group G3. The cover glass CG is disposed between the third lens group G3 and the image plane IP.

In this wide-angle lens 3, an aspheric surface is formed on each of an object-sided surface (a third surface) of the second lens L2 in the first lens group G1, an object-sided surface (a tenth surface) of the sixth lens L6 in the second lens group G2, and an image-sided surface (a sixteenth surface) of the ninth lens L9 in the third lens group G3. Values of the fourth, sixth, eighth, and tenth aspheric surface coefficients A4, A6, A8, and A10 in the foregoing aspheric surfaces are described in Table 8 together with the values of the conic constant K.

Further, Table 9 describes the values of the focal distance f of the whole lens system, the F-number Fno, the back focus BF, and the half angle of view ω.

TABLE 8

Example 3

| Surface No. | K | A4 | A6 | A8 | A10 |
|---|---|---|---|---|---|
| 3 | 0.000 | −5.55E−06 | −2.29E−09 | 3.94E−12 | −3.80E−15 |
| 10 | 0.000 | −4.80E−06 | 5.32E−09 | −4.82E−11 | 1.90E−14 |
| 11 | 0.000 | −1.09E−06 | −5.68E−10 | −4.59E−11 | −8.60E−14 |
| 16 | 0.000 | 7.25E−06 | −5.79E−09 | 1.99E−11 | −1.38E−14 |

TABLE 9

Example 3

| | |
|---|---|
| f | 34.0 |
| Fno | 1.44 |
| BF | 1.000 |
| ω | 32.99 |

FIG. 13 illustrates various types of aberration in Numerical Example 3. FIG. 13 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having the wavelength of 435.84 nm) and the C-line (having the wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 3 according to Numerical Example 3, and the wide-angle lens 3 according to Numerical Example 3 obviously has superior image formation performance.

Numerical Example 4

Table 10 describes lens data of Numerical Example 4 in which specific numerical values are applied to the wide-angle lens 4 illustrated in FIG. 4.

TABLE 10

Example 4

| Lens | Surface No. | Ri | Di | Ndi | vdi |
|---|---|---|---|---|---|
| G1 | 1 | 78.457 | 1.600 | 1.487489 | 70.4 |
| | 2 | 24.349 | 23.064 | | |
| | 3 | 53.021 | 5.600 | 1.953747 | 32.3 |
| | 4 | −686.135 | 0.300 | | |
| | 5 | 98.166 | 1.400 | 1.583130 | 59.5 |
| | 6(ASP) | 32.734 | 7.997 | | |
| | 7 | −62.833 | 1.500 | 1.805181 | 25.5 |
| | 8 | 30.775 | 9.977 | 1.729160 | 54.7 |
| | 9 | −65.010 | 0.712 | | |
| | 10(ASP) | 60.790 | 8.498 | 1.729030 | 54.0 |
| | 11 | −48.460 | 2.500 | | |
| | 12(STO) | INF | 2.811 | | |
| G2 | 13(ASP) | 827.331 | 1.400 | 1.693500 | 53.2 |
| | 14(ASP) | 31.073 | 3.146 | | |
| | 15 | 105.747 | 2.906 | 1.945945 | 18.0 |
| | 16 | 1216.167 | 10.588 | | |
| G3 | 17 | 60.641 | 6.117 | 1.882023 | 37.2 |
| | 18(ASP) | −41.011 | 0.300 | | |
| | 19 | −116.085 | 1.400 | 1.567320 | 42.8 |

TABLE 10-continued

Example 4

| Lens | Surface No. | Ri | Di | Ndi | vdi |
|---|---|---|---|---|---|
| | 20 | 26.158 | 2.380 | | |
| | 21 | 46.350 | 8.703 | 1.729160 | 54.7 |
| | 22 | −24.536 | 1.450 | 1.846663 | 23.8 |
| | 23 | 72.920 | 16.153 | | |
| | 24 | INF | 2.500 | 1.516798 | 64.2 |
| | 25 | INF | — | | |

In the wide-angle lens 4 illustrated in FIG. 4, the front lens group G1F includes a first lens (a negative lens) L1 that has a convex shape on the object side and has negative refractive power. The rear lens group G1R includes a second lens L2, a third lens L3, and a cemented lens including a fourth lens L4 and a fifth lens L5 that are cemented together. The second lens L2 has a biconvex shape and has positive refractive power. The third lens L3 has a convex shape on the object side and has negative refractive power. The fourth lens L4 has a biconcave shape and has negative refractive power. The fifth lens L5 is disposed on the image side of the fourth lens L4. The fifth lens L5 has a biconvex shape and has positive refractive power.

The second lens group G2 includes a seventh lens L7 and an eighth lens L8. The seventh lens L7 has a convex shape on the object side and has negative refractive power. The eighth lens L8 has a convex shape on the object side and has positive refractive power.

The third lens group G3 includes a ninth lens L9, a tenth lens L10, and a cemented lens including an eleventh lens L11 and a twelfth lens L12 that are cemented together. The ninth lens L9 has a biconvex shape and has positive refractive power. The tenth lens L10 has a biconcave shape and has negative refractive power. The eleventh lens L11 has a biconvex shape and has positive refractive power. The twelfth lens L12 is disposed on the image side of the eleventh lens L11. The twelfth lens L12 has a biconcave shape and has negative refractive power.

The image plane IP is disposed on the image side of the third lens group G3. The cover glass CG is disposed between the third lens group G3 and the image plane IP.

In this wide-angle lens 4, an aspheric surface is formed on each of an image-sided surface (a sixth surface) of the third lens L3 in the first lens group G1, an object-sided surface (a tenth surface) of the sixth lens L6 in the first lens group G1, an object-sided surface (a thirteenth surface) and an image-sided surface (a fourteenth surface) of the seventh lens L7 in the second lens group G2, and an image-sided surface (an eighteenth surface) of the ninth lens L9 in the third lens group G3. Values of the fourth, sixth, eighth, and tenth aspheric surface coefficients A4, A6, A8, and A10 in the foregoing aspheric surfaces are described in Table 11 together with the values of the conic constant K.

Further, Table 12 describes the values of the focal distance f of the whole lens system, the F-number Fno, the back focus BF, and the half angle of view ω.

TABLE 11

Example 4

| Surface No. | K | A4 | A6 | A8 | A10 |
|---|---|---|---|---|---|
| 6 | 0.000 | 3.37E−06 | 7.58E−09 | 2.93E−12 | −1.26E−14 |
| 10 | 0.000 | −2.82E−06 | −4.64E−10 | 3.06E−12 | 0.00E+00 |

TABLE 11-continued

Example 4

| Surface No. | K | A4 | A6 | A8 | A10 |
|---|---|---|---|---|---|
| 13 | 0.000 | −3.52E−06 | 1.15E−08 | −3.51E−11 | −1.46E−15 |
| 14 | 0.000 | −1.81E−06 | 3.82E−09 | −1.11E−11 | −6.69E−14 |
| 18 | 0.000 | 5.63E−06 | −7.19E−09 | 2.24E−11 | −3.03E−14 |

TABLE 12

Example 4

| f | 34.0 |
|---|---|
| Fno | 1.44 |
| BF | 1.000 |
| ω | 32.80 |

FIG. 14 illustrates various types of aberration in Numerical Example 4. FIG. 14 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having the wavelength of 435.84 nm) and the C-line (having the wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 4 according to Numerical Example 4, and the wide-angle lens 4 according to Numerical Example 4 obviously has superior image formation performance.

Numerical Example 5

Table 13 describes lens data of Numerical Example 5 in which specific numerical values are applied to the wide-angle lens 5 illustrated in FIG. 5.

TABLE 13

Example 5

| Lens | Surface No. | Ri | Di | Ndi | vdi |
|---|---|---|---|---|---|
| G1 | 1 | 68.061 | 1.500 | 1.487489 | 70.4 |
| | 2 | 26.273 | 10.161 | | |
| | 3 | 92.654 | 1.500 | 1.487489 | 70.4 |
| | 4 | 42.863 | 8.234 | | |
| | 5 | 59.321 | 5.172 | 1.921190 | 24.0 |
| | 6 | 250.946 | 15.418 | | |
| | 7 | −140.329 | 1.450 | 1.832137 | 22.7 |
| | 8 | 27.442 | 7.914 | 1.729030 | 54.0 |
| | 9(ASP) | −190.000 | 2.868 | | |
| | 10 | 71.173 | 7.996 | 1.881000 | 40.1 |
| | 11 | −48.500 | 2.500 | | |
| | 12(STO) | INF | 2.800 | | |
| G2 | 13(ASP) | −2362.306 | 1.400 | 1.693500 | 53.2 |
| | 14(ASP) | 28.211 | 2.816 | | |
| | 15 | 95.518 | 2.754 | 1.922860 | 20.9 |
| | 16 | 1125.959 | 9.577 | | |
| G3 | 17 | 59.246 | 5.070 | 1.851350 | 40.1 |
| | 18(ASP) | −54.440 | 0.300 | | |
| | 19 | 66.319 | 2.303 | 1.711375 | 26.7 |
| | 20 | 26.610 | 2.966 | | |

TABLE 13-continued

Example 5

| Lens | Surface No. | Ri | Di | Ndi | vdi |
|---|---|---|---|---|---|
| | 21 | 101.856 | 6.912 | 1.777567 | 43.2 |
| | 22 | −24.000 | 2.350 | 1.710234 | 26.8 |
| | 23 | 52.000 | 17.539 | | |
| | 24 | INF | 2.500 | 1.516798 | 64.2 |
| | 25 | INF | — | | |

In the wide-angle lens 5 illustrated in FIG. 5, the front lens group G1F includes a first lens (a negative lens) L1, a second lens L2, and a third lens L3. The first lens L1 has a convex shape on the object side and has negative refractive power. The second lens L2 has a convex shape on the object side and has negative refractive power. The third lens L3 has a convex shape on the object side and has positive refractive power. The rear lens group G1R includes a cemented lens including a fourth lens L4 and a fifth lens L5 that are cemented together and a sixth lens L6. The fourth lens L4 has a biconcave shape and has negative refractive power. The fifth lens L5 is disposed on the image side of the fourth lens L4. The fifth lens L5 has a biconvex shape and has positive refractive power. The sixth lens L6 has a biconvex shape and has positive refractive power.

The second lens group G2 includes a seventh lens L7 and an eighth lens L8. The seventh lens L7 has a biconcave shape and has negative refractive power. The eighth lens L8 has a convex shape on the object side and has positive refractive power.

The third lens group G3 includes a ninth lens L9, a tenth lens L10, and a cemented lens including an eleventh lens L11 and a twelfth lens L12 that are cemented together. The ninth lens L9 has a biconvex shape and has positive refractive power. The tenth lens L10 has a convex shape on the object side and has negative refractive power. The eleventh lens L11 has a biconvex shape and has positive refractive power. The twelfth lens L12 is disposed on the image side of the eleventh lens L11. The twelfth lens L12 has a biconcave shape and has negative refractive power.

The image plane IP is disposed on the image side of the third lens group G3. The cover glass CG is disposed between the third lens group G3 and the image plane IP.

In this wide-angle lens 5, an aspheric surface is formed on each of an image-sided surface (a ninth surface) of the fifth lens L5 in the first lens group G1, an object-sided surface (a thirteenth surface) and an image-sided surface (a fourteenth surface) of the seventh lens L7 in the second lens group G2, and an image-sided surface (an eighteenth surface) of the ninth lens L9 in the third lens group G3. Values of the fourth, sixth, eighth, and tenth aspheric surface coefficients A4, A6, A8, and A10 in the foregoing aspheric surfaces are described in Table 14 together with the values of the conic constant K.

Further, Table 15 describes the values of the focal distance f of the whole lens system, the F-number Fno, the back focus BF, and the half angle of view ω.

TABLE 14

Example 5

| Surface No. | K | A4 | A6 | A8 | A10 |
|---|---|---|---|---|---|
| 9 | 0.000 | 7.10E−06 | 1.15E−09 | 6.81E−12 | −9.14E−15 |
| 13 | 0.000 | −4.68E−06 | 1.03E−09 | 2.17E−11 | −3.50E−14 |

TABLE 14-continued

Example 5

| Surface No. | K | A4 | A6 | A8 | A10 |
|---|---|---|---|---|---|
| 14 | 0.000 | −4.89E−06 | −1.32E−08 | 6.74E−11 | −1.16E−13 |
| 18 | 0.000 | 5.46E−06 | −8.31E−09 | 2.17E−11 | −3.35E−14 |

TABLE 15

Example 5

| | |
|---|---|
| f | 34.0 |
| Fno | 1.44 |
| BF | 1.000 |
| ω | 32.84 |

FIG. 15 illustrates various types of aberration in Numerical Example 5. FIG. 15 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having the wavelength of 435.84 nm) and the C-line (having the wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 5 according to Numerical Example 5, and the wide-angle lens 5 according to Numerical Example 5 obviously has superior image formation performance.

Numerical Example 6

Table 16 describes lens data of Numerical Example 6 in which specific numerical values are applied to the wide-angle lens 6 illustrated in FIG. 6.

TABLE 16

Example 6

| Lens group | Surface No. | Ri | Di | Ndi | vdi |
|---|---|---|---|---|---|
| G1 | 1 | 600.000 | 1.500 | 1.487489 | 70.4 |
| | 2 | 23.490 | 21.900 | | |
| | 3(ASP) | 118.319 | 8.500 | 1.851348 | 40.1 |
| | 4 | −35.500 | 1.500 | 1.805181 | 25.5 |
| | 5 | −75.350 | 3.900 | | |
| | 6 | 176.500 | 1.450 | 1.761818 | 26.6 |
| | 7 | 44.930 | 10.690 | 1.729160 | 54.7 |
| | 8 | −44.930 | 2.600 | | |
| | 9(STO) | INF | 2.817 | | |
| G2 | 10(ASP) | 542.465 | 1.500 | 1.583130 | 59.5 |
| | 11(ASP) | 23.272 | 11.285 | | |
| G3 | 12 | 39.140 | 6.570 | 1.729160 | 54.7 |
| | 13 | −44.980 | 0.300 | | |
| | 14(ASP) | 103.026 | 2.140 | 1.806100 | 40.7 |
| | 15 | 30.510 | 3.150 | | |
| | 16 | 109.300 | 6.610 | 1.883000 | 40.8 |
| | 17 | −27.350 | 1.450 | 1.740770 | 27.8 |
| | 18 | 61.800 | 18.530 | | |
| | 19 | INF | 2.500 | 1.516798 | 64.2 |
| | 20 | INF | — | | |

In the wide-angle lens 6 illustrated in FIG. 6, the front lens group G1F includes a first lens (a negative lens) L1 that has a convex shape on the object side and has negative refractive power. The rear lens group G1R includes a first cemented lens including a second lens L2 and a third lens L3 that are cemented together, and a second cemented lens including a fourth lens L4 and a fifth lens L5 that are cemented together. The second lens L2 has a biconvex shape and has positive refractive power. The third lens L3 is disposed on the image side of the second lens L2. The third lens L3 has a convex shape on the image side and has negative refractive power. The fourth lens L4 has a convex shape on the object side and has negative refractive power. The fifth lens L5 is disposed on the image side of the fourth lens L4. The fifth lens L5 has a biconvex shape and has positive refractive power.

The second lens group G2 includes a sixth lens L6 that has a convex shape on the object side and has negative refractive power.

The third lens group G3 includes a seventh lens L7, an eighth lens L8, and a cemented lens including a ninth lens L9 and a tenth lens L10 that are cemented together. The seventh lens L7 has a biconvex shape and has positive refractive power. The eighth lens L8 has a convex shape on the object side and has negative refractive power. The ninth lens L9 has a biconvex shape and has positive refractive power. The tenth lens L10 is disposed on the image side of the ninth lens L9. The tenth lens L10 has a biconcave shape and has negative refractive power.

The image plane IP is disposed on the image side of the third lens group G3. The cover glass CG is disposed between the third lens group G3 and the image plane IP.

In this wide-angle lens 6, an aspheric surface is formed on each of an image-sided surface (a third surface) of the second lens L2 in the first lens group G1, an object-sided surface (a tenth surface) and an image-sided surface (an eleventh surface) of the sixth lens L6 in the second lens group G2, and an image-sided surface (a fourteenth surface) of the eighth lens L8 in the third lens group G3. Values of the fourth, sixth, eighth, and tenth aspheric surface coefficients A4, A6, A8, and A10 in the foregoing aspheric surfaces are described in Table 17 together with the values of the conic constant K.

Further, Table 18 describes the values of the focal distance f of the whole lens system, the F-number Fno, the back focus BF, and the half angle of view ω.

TABLE 17

Example 6

| Surface No. | K | A4 | A6 | A8 | A10 |
|---|---|---|---|---|---|
| 3 | 0.000 | −5.75E−06 | −4.60E−10 | 2.24E−13 | 0.00E+00 |
| 10 | 0.000 | 1.21E−06 | −1.77E−08 | 9.10E−12 | 0.00E+00 |
| 11 | 0.000 | 1.36E−06 | −1.55E−08 | −7.47E−12 | 0.00E+00 |
| 14 | 0.000 | −9.60E−06 | −1.98E−09 | −1.37E−11 | 0.00E+00 |

TABLE 18

| Example 6 | |
|---|---|
| f | 34.0 |
| Fno | 1.44 |
| BF | 1.000 |
| ω | 33.22 |

FIG. 16 illustrates various types of aberration in Numerical Example 6. FIG. 16 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having the wavelength of 435.84 nm) and the C-line (having the wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 6 according to Numerical Example 6, and the wide-angle lens 6 according to Numerical Example 6 obviously has superior image formation performance.

Numerical Example 7

Table 19 describes lens data of Numerical Example 7 in which specific numerical values are applied to the wide-angle lens 7 illustrated in FIG. 7.

TABLE 19

| Example 7 | | | | | |
|---|---|---|---|---|---|
| Lens | Surface No. | Ri | Di | Ndi | νdi |
| G1 | 1 | 67.840 | 1.500 | 1.487489 | 70.4 |
|  | 2 | 26.226 | 14.289 |  |  |
|  | 3 | −133.965 | 1.500 | 1.487489 | 70.4 |
|  | 4 | 76.498 | 1.925 |  |  |
|  | 5 | 132.394 | 6.000 | 1.851350 | 40.1 |
|  | 6(ASP) | −97.206 | 18.190 |  |  |
|  | 7 | −77.983 | 1.450 | 1.759994 | 26.7 |
|  | 8 | 36.032 | 8.079 | 1.729030 | 54.0 |
|  | 9(ASP) | −77.651 | 0.601 |  |  |
|  | 10 | 73.189 | 8.518 | 1.729160 | 54.7 |
|  | 11 | −43.939 | 2.500 |  |  |
|  | 12(STO) | INF | 2.800 |  |  |
| G2 | 13(ASP) | −274.520 | 1.500 | 1.693500 | 53.2 |
|  | 14(ASP) | 29.415 | 3.390 |  |  |
|  | 15 | 255.071 | 3.177 | 1.922860 | 20.9 |
|  | 16 | −125.996 | 9.669 |  |  |
| G3 | 17 | 50.316 | 5.525 | 1.851350 | 40.1 |
|  | 18(ASP) | −55.276 | 0.300 |  |  |
|  | 19 | 71.004 | 1.662 | 1.647690 | 33.8 |
|  | 20 | 24.334 | 3.277 |  |  |
|  | 21 | 83.428 | 7.080 | 1.772500 | 49.6 |
|  | 22 | −24.500 | 1.450 | 1.792107 | 25.5 |
|  | 23 | 52.000 | 17.118 |  |  |
|  | 24 | INF | 2.500 | 1.516798 | 64.2 |
|  | 25 | INF | — |  |  |

In the wide-angle lens 7 illustrated in FIG. 7, the front lens group G1F includes a first lens (a negative lens) L1, a second lens L2, and a third lens L3. The first lens L1 has a convex shape on the object side and has negative refractive power. The second lens L2 has a biconcave shape and has negative refractive power. The third lens L3 has a biconvex shape and has positive refractive power. The rear lens group G1R includes a cemented lens including a fourth lens L4 and a fifth lens L5 that are cemented together and a sixth lens L6. The fourth lens L4 has a biconcave shape and has negative refractive power. The fifth lens L5 is disposed on the image side of the fourth lens L4. The fifth lens L5 has a biconvex shape and has positive refractive power. The sixth lens L6 has a biconvex shape and has positive refractive power.

The second lens group G2 includes a seventh lens L7 and an eighth lens L8. The seventh lens L7 has a biconcave shape and has negative refractive power. The eighth lens L8 has a biconvex shape and positive refractive power.

The third lens group G3 includes a ninth lens L9, a tenth lens L10, and a cemented lens including an eleventh lens L11 and a twelfth lens L12 that are cemented together. The ninth lens L9 has a biconvex shape and has positive refractive power. The tenth lens L10 has a convex shape on the object side and has negative refractive power. The eleventh lens L11 has a biconvex shape and has positive refractive power. The twelfth lens L12 is disposed on the image side of the eleventh lens L11. The twelfth lens L12 has a biconcave shape and has negative refractive power.

The image plane IP is disposed on the image side of the third lens group G3. The cover glass CG is disposed between the third lens group G3 and the image plane IP.

In this wide-angle lens 7, an aspheric surface is formed on each of an image-sided surface (a sixth surface) of the third lens L3 in the first lens group G1, an image-sided surface (a ninth surface) of the fifth lens L5 in the first lens group G1, an object-sided surface (a thirteenth surface) and an image-sided surface (a fourteenth surface) of the seventh lens L7 in the second lens group G2, and an image-sided surface (an eighteenth surface) of the ninth lens L9 in the third lens group G3. Values of the fourth, sixth, eighth, and tenth aspheric surface coefficients A4, A6, A8, and A10 in the foregoing aspheric surfaces are described in Table 20 together with the values of the conic constant K.

Further, Table 21 describes the values of the focal distance f of the whole lens system, the F-number Fno, the back focus BF, and the half angle of view ω.

TABLE 20

| Example 7 | | | | | |
|---|---|---|---|---|---|
| Surface No. | K | A4 | A6 | A8 | A10 |
| 6 | 0.000 | 1.61E−06 | 8.65E−11 | −1.79E−12 | 3.49E−15 |
| 9 | 0.000 | 5.45E−06 | 3.29E−09 | 1.05E−12 | 3.30E−15 |
| 13 | 0.000 | −7.00E−06 | 2.47E−08 | −8.29E−11 | 1.19E−13 |
| 14 | 0.000 | −7.39E−06 | 1.77E−08 | −8.96E−11 | 1.34E−13 |
| 18 | 0.000 | 5.07E−06 | −6.99E−09 | 1.68E−11 | −1.92E−14 |

TABLE 21

| Example 7 | |
|---|---|
| f | 34.0 |
| Fno | 1.44 |
| BF | 1.000 |
| ω | 33.01 |

FIG. 17 illustrates various types of aberration in Numerical Example 7. FIG. 17 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having the wavelength of 435.84 nm) and the C-line (having the wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 7 according to Numerical Example 7, and the wide-angle lens 7 according to Numerical Example 7 obviously has superior image formation performance.

Numerical Example 8

Table 22 describes lens data of Numerical Example 8 in which specific numerical values are applied to the wide-angle lens 8 illustrated in FIG. 8.

TABLE 22

| | | Example 8 | | | |
|---|---|---|---|---|---|
| Lens | Surface No. | Ri | Di | Ndi | vdi |
| G1 | 1 | 97.003 | 1.500 | 1.487489 | 70.4 |
| | 2 | 25.000 | 34.286 | | |
| | 3(ASP) | 109.000 | 9.600 | 1.801390 | 45.5 |
| | 4 | −32.500 | 1.945 | 1.805180 | 25.5 |
| | 5 | −70.138 | 1.466 | | |
| | 6 | 10664.217 | 1.500 | 1.730837 | 28.4 |
| | 7 | 35.806 | 11.300 | 1.772500 | 49.6 |
| | 8 | −49.557 | 2.500 | | |
| | 9(STO) | INF | 2.920 | | |
| G2 | 10(ASP) | 226.345 | 1.400 | 1.693500 | 53.2 |
| | 11(ASP) | 28.000 | 3.102 | | |
| | 12 | 113.140 | 4.388 | 1.945950 | 18.0 |
| | 13 | −44.601 | 1.450 | 1.704090 | 29.7 |
| | 14 | 48.820 | 7.535 | | |
| G3 | 15 | 39.132 | 6.356 | 1.816488 | 42.9 |
| | 16(ASP) | −36.151 | 0.300 | | |
| | 17 | −71.146 | 1.400 | 1.739648 | 27.7 |
| | 18 | 27.674 | 1.852 | | |
| | 19 | 49.531 | 8.348 | 1.799209 | 46.6 |
| | 20 | −24.100 | 1.500 | 1.834630 | 24.1 |
| | 21 | 150.000 | 16.353 | | |
| | 22 | INF | 2.500 | 1.516798 | 64.2 |
| | 23 | INF | — | | |

In the wide-angle lens 8 illustrated in FIG. 8, the front lens group G1F includes a first lens (a negative lens) L1 that has a convex shape on the object side and has negative refractive power. The rear lens group G1R includes a first cemented lens including a second lens L2 and a third lens L3 that are cemented together, and a second cemented lens including a fourth lens L4 and a fifth lens L5 that are cemented together. The second lens L2 has a biconvex shape and has positive refractive power. The third lens L3 is disposed on the image side of the second lens L2. The third lens L3 has a convex shape on the image side and has negative refractive power. The fourth lens L4 has a convex shape on the object side and has negative refractive power. The fifth lens L5 is disposed on the image side of the fourth lens L4. The fifth lens L5 has a biconvex shape and has positive refractive power.

The second lens group G2 includes a sixth lens L6 and a cemented lens including a seventh lens L7 and an eighth lens L8 that are cemented together. The sixth lens L6 has a convex shape on the object side and has negative refractive power. The seventh lens L7 has a biconvex shape and has positive refractive power. The eighth lens L8 is disposed on the image side of the seventh lens L7. The eighth lens L8 has a biconcave shape and has negative refractive power.

The third lens group G3 includes a ninth lens L9, a tenth lens L10, and a cemented lens including an eleventh lens L11 and a twelfth lens L12 that are cemented together. The ninth lens L9 has a biconvex shape and has positive refractive power. The tenth lens L10 has a biconcave shape and has negative refractive power. The eleventh lens L11 has a biconvex shape and has positive refractive power. The twelfth lens L12 is disposed on the image side of the eleventh lens L11. The twelfth lens L12 has a biconcave shape and has negative refractive power.

The image plane IP is disposed on the image side of the third lens group G3. The cover glass CG is disposed between the third lens group G3 and the image plane IP.

In this wide-angle lens 8, an aspheric surface is formed on each of an object-sided surface (a third surface) of the second lens L2 in the first lens group G1, an object-sided surface (a tenth surface) and an image-sided surface (an eleventh surface) of the sixth lens L6 in the second lens group G2, and an image-sided surface (a sixteenth surface) of the ninth lens L9 in the third lens group G3. Values of the fourth, sixth, eighth, and tenth aspheric surface coefficients A4, A6, A8, and A10 in the foregoing aspheric surfaces are described in Table 23 together with the values of the conic constant K.

Further, Table 24 describes the values of the focal distance f of the whole lens system, the F-number Fno, the back focus BF, and the half angle of view ω.

TABLE 23

| | | Example 8 | | | |
|---|---|---|---|---|---|
| Surface No. | K | A4 | A6 | A8 | A10 |
| 3 | 0.000 | −5.76E−06 | −2.15E−09 | 3.91E−12 | −3.99E−15 |
| 10 | 0.000 | 6.48E−07 | −2.70E−08 | 5.06E−11 | −9.69E−14 |
| 11 | 0.000 | 5.01E−06 | −3.38E−08 | 5.46E−11 | −1.97E−13 |
| 16 | 0.000 | 6.95E−06 | −3.90E−09 | 8.84E−12 | 1.05E−14 |

TABLE 24

| Example 8 | |
|---|---|
| f | 34.0 |
| Fno | 1.44 |
| BF | 1.000 |
| ω | 32.94 |

FIG. 18 illustrates various types of aberration in Numerical Example 8. FIG. 18 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having the wavelength of 435.84 nm) and the C-line (having the wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 8 according to Numerical Example 8, and the wide-angle lens 8 according to Numerical Example 8 obviously has superior image formation performance.

Numerical Example 9

Table 25 describes lens data of Numerical Example 9 in which specific numerical values are applied to the wide-angle lens 9 illustrated in FIG. 9.

TABLE 25

Example 9

| Lens | Surface No. | Ri | Di | Ndi | vdi |
|------|-------------|-----|-----|------|------|
| G1 | 1 | 39.713 | 1.800 | 1.638542 | 55.4 |
|  | 2 | 18.237 | 11.015 |  |  |
|  | 3 | 91.617 | 1.500 | 1.540720 | 47.2 |
|  | 4 | 31.069 | 16.670 |  |  |
|  | 5(ASP) | 166.767 | 9.399 | 1.882023 | 37.2 |
|  | 6 | −20.239 | 1.500 | 1.784719 | 25.7 |
|  | 7 | −65.629 | 1.000 |  |  |
|  | 8 | 104.265 | 1.000 | 1.846663 | 23.8 |
|  | 9 | 33.327 | 9.621 | 1.772500 | 49.6 |
|  | 10 | −39.431 | 2.500 |  |  |
|  | 11(STO) | INF | 2.800 |  |  |
| G2 | 12(ASP) | 191.338 | 1.000 | 1.834410 | 37.3 |
|  | 13(ASP) | 25.609 | 4.442 |  |  |
|  | 14 | 222.605 | 5.053 | 1.945945 | 18.0 |
|  | 15 | −21.388 | 1.100 | 1.728250 | 28.3 |
|  | 16 | 54.702 | 3.448 |  |  |
| G3 | 17 | 37.581 | 7.595 | 1.729160 | 54.7 |
|  | 18 | −36.129 | 0.300 |  |  |
|  | 19(ASP) | 77.269 | 1.100 | 1.834410 | 37.3 |
|  | 20(ASP) | 29.476 | 2.846 |  |  |
|  | 21 | 83.539 | 7.000 | 1.804200 | 46.5 |
|  | 22 | −17.874 | 1.300 | 1.945945 | 18.0 |
|  | 23 | 170.190 | 12.511 |  |  |
|  | 24 | INF | 2.500 | 1.516798 | 64.2 |
|  | 25 | INF | — |  |  |

In the wide-angle lens 9 illustrated in FIG. 9, the front lens group G1F includes a first lens (a negative lens) L1 and a second lens L2. The first lens L1 has a convex shape on the object side and has negative refractive power. The second lens L2 has a convex shape on the object side and has negative refractive power. The rear lens group G1R includes a first cemented lens including a third lens L3 and a fourth lens L4 that are cemented together, and a second cemented lens including a fifth lens L5 and a sixth lens L6 that are cemented together. The third lens L3 has a biconvex shape and has positive refractive power. The fourth lens L4 is disposed on the image side of the third lens L3. The fourth lens L4 has a convex shape on the image side and has negative refractive power. The fifth lens L5 has a convex shape on the object side and has negative refractive power. The sixth lens L6 is disposed on the image side of the fifth lens L5. The sixth lens L6 has a biconvex shape and has positive refractive power.

The second lens group G2 includes a seventh lens L7 and a cemented lens including an eighth lens L8 and a ninth lens L9 that are cemented together. The seventh lens L7 has a convex shape on the object side and has negative refractive power. The eighth lens L8 has a biconvex shape and has positive refractive power. The ninth lens L9 is disposed on the image side of the eighth lens L8. The ninth lens L9 has a biconcave shape and has negative refractive power.

The third lens group G3 includes a tenth lens L10, an eleventh lens L11, and a cemented lens including a twelfth lens L12 and a thirteenth lens L13. The tenth lens L10 has a biconvex shape and positive refractive power. The eleventh lens L11 has a convex shape on the object side and has negative refractive power. The twelfth lens L12 has a biconvex shape and positive refractive power. The thirteenth lens L13 is disposed on the image side of the twelfth lens L12. The thirteenth lens L13 has a biconcave shape and has negative refractive power.

The image plane IP is disposed on the image side of the third lens group G3. The cover glass CG is disposed between the third lens group G3 and the image plane IP.

In this wide-angle lens 9, an aspheric surface is formed on each of an object-sided surface (a fifth surface) of the third lens L3 in the first lens group G1, an object-sided surface (a twelfth surface) and an image-sided surface (a thirteenth surface) of the seventh lens L7 in the second lens group G2, and an object-sided surface (a nineteenth surface) and an image-sided surface (a twentieth surface) of the eleventh lens L11 in the third lens group G3. Values of the fourth, sixth, eighth, and tenth aspheric surface coefficients A4, A6, A8, and A10 in the foregoing aspheric surfaces are described in Table 26 together with the values of the conic constant K.

Further, Table 27 describes the values of the focal distance f of the whole lens system, the F-number Fno, the back focus BF, and the half angle of view ω.

TABLE 26

Example 9

| Surface No. | K | A4 | A6 | A8 | A10 |
|-------------|-----|-----|-----|-----|-----|
| 6 | 0.000 | −1.10E−05 | −1.91E−09 | −4.70E−12 | 0.00E+00 |
| 12 | 0.000 | −8.18E−06 | −2.02E−08 | −4.67E−12 | 0.00E+00 |
| 13 | 0.000 | −1.56E−07 | −2.49E−08 | 7.45E−13 | −1.89E−13 |
| 19 | 0.000 | −1.31E−05 | 9.99E−08 | −3.35E−10 | 0.00E+00 |
| 20 | 0.000 | −4.09E−06 | 1.13E−07 | −2.47E−10 | 1.09E−14 |

TABLE 27

Example 9

| f | 23.3 |
| Fno | 1.44 |
| BF | 1.000 |
| ω | 43.78 |

FIG. 19 illustrates various types of aberration in Numerical Example 9. FIG. 19 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having the wavelength of 435.84 nm) and the C-line (having the wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 9 according to Numerical Example 9, and the wide-angle lens 9 according to Numerical Example 9 obviously has superior image formation performance.

Numerical Example 10

Table 28 describes lens data of Numerical Example 10 in which specific numerical values are applied to the wide-angle lens 10 illustrated in FIG. 10.

TABLE 28

Example 10

| Lens | Surface No. | Ri | Di | Ndi | vdi |
|---|---|---|---|---|---|
| G1 | 1 | 72.567 | 1.400 | 1.487489 | 70.4 |
|  | 2 | 15.271 | 10.231 |  |  |
|  | 3 | −17.441 | 0.800 | 1.581440 | 40.9 |
|  | 4 | −1782.041 | 0.200 |  |  |
|  | 5 | 36.075 | 1.000 | 1.846663 | 23.8 |
|  | 6 | 26.243 | 6.348 | 1.496997 | 81.6 |
|  | 7 | −27.198 | 0.200 |  |  |
|  | 8(ASP) | 33.775 | 5.458 | 1.772502 | 49.5 |
|  | 9(ASP) | −39.765 | 2.300 |  |  |
|  | 10(STO) | INF | 2.300 |  |  |
| G2 | 11(ASP) | 44.681 | 1.000 | 1.583130 | 59.5 |
|  | 12(ASP) | 18.127 | 8.871 |  |  |
| G3 | 13(ASP) | −44.784 | 3.142 | 1.583130 | 59.5 |
|  | 14(ASP) | −19.714 | 2.428 |  |  |
|  | 15 | −137.164 | 5.845 | 1.496997 | 81.6 |
|  | 16 | −19.682 | 5.367 |  |  |
|  | 17 | −32.556 | 1.300 | 1.846663 | 23.8 |
|  | 18 | 250.000 | 15.309 |  |  |
|  | 19 | INF | 2.500 | 1.516798 | 64.2 |
|  | 20 | INF | — |  |  |

In the wide-angle lens 10 illustrated in FIG. 10, the front lens group G1F includes a first lens (a negative lens) L1 that has a convex shape on the object side and has negative refractive power. The rear lens group G1R includes a second lens L2, a cemented lens including a third lens L3 and a fourth lens L4 that are cemented together, and a fifth lens L5. The second lens L2 has a convex shape on the image side and has negative refractive power. The third lens L3 has a convex shape on the object side and has negative refractive power. The fourth lens L4 is disposed on the image side of the third lens L3. The fourth lens L4 has a biconvex shape and has positive refractive power. The fifth lens L5 has a biconvex shape and has positive refractive power.

The second lens group G2 includes a sixth lens L6 that has a convex shape on the object side and has negative refractive power.

The third lens group G3 includes a seventh lens L7, an eighth lens L8, and a ninth lens L9. The seventh lens L7 has a convex shape on the image side and has positive refractive power. The eighth lens L8 has a convex shape on the image side and has positive refractive power. The ninth lens L9 has a biconcave shape and has negative refractive power.

The image plane IP is disposed on the image side of the third lens group G3. The cover glass CG is disposed between the third lens group G3 and the image plane IP.

In this wide-angle lens 10, an aspheric surface is formed on each of an object-sided surface (an eighth surface) and an image-sided surface (a ninth surface) of the fifth lens L5 in the first lens group G1, an object-sided surface (an eleventh surface) and an image-sided surface (a twelfth surface) of the sixth lens L6 in the second lens group G2, and an object-sided surface (a thirteenth surface) and an image-sided surface (a fourteenth surface) of the seventh lens L7 in the third lens group G3. Values of the fourth, sixth, eighth, and tenth aspheric surface coefficients A4, A6, A8, and A10 in the foregoing aspheric surfaces are described in Table 29 together with the values of the conic constant K.

Further, Table 30 describes the values of the focal distance f of the whole lens system, the F-number Fno, the back focus BF, and the half angle of view ω.

TABLE 29

Example 10

| Surface No. | K | A4 | A6 | A8 | A10 |
|---|---|---|---|---|---|
| 8 | 0.000 | −4.52E−06 | −4.73E−08 | 4.64E−10 | −3.50E−13 |
| 9 | 0.000 | 1.82E−05 | −6.29E−08 | 5.57E−10 | −6.15E−13 |
| 11 | 0.000 | −5.29E−05 | 3.38E−07 | −1.35E−09 | 0.00E+00 |
| 12 | 0.000 | −5.19E−05 | 3.65E−07 | −1.30E−09 | −3.70E−12 |
| 13 | 0.000 | 0.00E+00 | 3.09E−07 | −8.76E−10 | 1.10E−12 |
| 14 | 0.000 | 2.68E−05 | 2.47E−07 | 0.00E+00 | 0.00E+00 |

TABLE 30

Example 10

| f | 28.2 |
|---|---|
| Fno | 2.06 |
| BF | 1.000 |
| ω | 38.27 |

FIG. 20 illustrates various types of aberration in Numerical Example 10. FIG. 20 illustrates, as the various types of aberration, spherical aberration, astigmatism (field curvature), distortion, and lateral aberration (coma aberration). Each of the aberration diagrams illustrates aberration with the d-line (having the wavelength of 587.6 nm) as a reference wavelength. Each of the spherical aberration diagram and the coma aberration diagram illustrates aberration for the g-line (having the wavelength of 435.84 nm) and the C-line (having the wavelength of 656.28 nm). A solid line in the astigmatism diagram indicates a value in a sagittal image plane and a double-dotted dashed line in the astigmatism diagram indicates a value in a meridional image plane.

As can be appreciated from the respective aberration diagrams, the respective types of aberration are favorably corrected in the wide-angle lens 1 according to Numerical Example 10, and the wide-angle lens 10 according to Numerical Example 10 obviously has superior image formation performance.

Other Numerical Value Data of Respective Examples

Table 31 summarizes the values related to the respective conditional expressions described above for the respective numerical examples. Further, Table 32 summarizes the values related to the parameters in the respective conditional expressions for the respective numerical examples. As can be appreciated from Table 31, the values in the respective numerical examples fall in the numerical range of the related values for the respective conditional expressions.

TABLE 31

| Conditional expression | Example 1 | Example 2 | Example 3 | Example 4 | Example 5 |
|---|---|---|---|---|---|
| (1) f1/f | 0.83 | 0.95 | 0.83 | 0.94 | 0.91 |
| (2) f1R/f | 1.07 | 1.03 | 1.15 | 1.12 | 1.23 |
| (3) f2/f3 | −0.79 | −0.96 | −0.82 | −0.96 | −0.92 |

| | Example 6 | Example 7 | Example 8 | Example 9 | Example 10 |
|---|---|---|---|---|---|
| (1) f1/f | 0.83 | 0.90 | 0.79 | 0.81 | 0.89 |
| (2) f1R/f | 1.05 | 1.23 | 1.17 | 1.25 | 0.90 |
| (3) f2/f3 | −0.83 | −0.88 | −0.76 | −0.79 | −0.84 |

TABLE 32

|     | Example 1 | Example 2 | Example 3 | Example 4 | Example 5 |
|-----|-----------|-----------|-----------|-----------|-----------|
| f1  | 28.67     | 32.26     | 28.10     | 31.93     | 31.01     |
| f   | 34.61     | 34.01     | 33.99     | 33.97     | 33.95     |
| f1R | 30.78     | 33.28     | 32.41     | 35.86     | 38.05     |
| f2  | −41.92    | −76.77    | −46.10    | −78.34    | −64.79    |
| f3  | 53.28     | 79.67     | 56.52     | 81.90     | 70.30     |

|     | Example 6 | Example 7 | Example 8 | Example 9 | Example 10 |
|-----|-----------|-----------|-----------|-----------|------------|
| f1  | 28.18     | 30.62     | 27.00     | 18.87     | 25.21      |
| f   | 33.95     | 33.95     | 34.01     | 23.28     | 28.23      |
| f1R | 29.58     | 37.58     | 31.67     | 23.58     | 22.71      |
| f2  | −41.74    | −71.69    | −44.12    | −36.79    | −53.04     |
| f3  | 50.51     | 81.51     | 57.71     | 46.67     | 63.19      |

5. Other Embodiments

The technology of the disclosure is not limited to the description above of the embodiments and Examples, and various modifications may be made.

For example, the shape and the numerical value of each member described in the respective numerical examples above are mere examples of embodiment for carrying out the present technology. The technical scope of the present technology should not be limitedly understood on the basis of the shape and the numerical value of each member described in the respective numerical examples above.

Moreover, the embodiments and Examples described above are described referring to the configuration that substantially includes three lens groups. However, a configuration that further includes a lens substantially have no refractive power may be adopted.

Moreover, for example, the present technology may have the following configurations.

[1]

A wide-angle lens including:
a first lens group that has positive refractive power;
a second lens group that has negative refractive power;
a third lens group that has positive refractive power;
a fourth lens group that has positive refractive power; and
a fifth lens group that has negative refractive power, the first lens group, the second lens group, the third lens group, the fourth lens group, and the fifth lens group being disposed in order from object side toward image side, wherein,
upon variation in magnification, each of the first lens group, the second lens group, the third lens group, and the fourth lens group is caused to travel along an optical axis and the fifth lens group is fixed,
the fourth lens group is caused to travel toward the object side along the optical axis upon variation in subject distance from infinite to proximity, and
the following conditional expression is satisfied, $$-0.97<fw/f12w<-0.6 \tag{1}'$$

where fw is a focal distance of a whole system at a wide-angle end,
and f12w is a combined focal distance of the first lens group and the second lens group at the wide-angle end.

[2]

The wide-angle lens according to [1], wherein
the first lens group includes a front lens group and a rear lens group that are disposed in order from the object side with a maximum lens spacing in between on an optical axis, the front lens group having negative refractive power, the rear lens group having positive refractive power, and the following conditional expression is satisfied, $$0.9 \leq f1R/f1<1.5 \tag{2}$$

where f1R is a focal distance of the rear lens group in the condition that the infinite is in focus.

[3]

The wide-angle lens according to [1] or [2], wherein the following conditional expression is further satisfied, $$-1.0<f2/f3<-0.5 \tag{3}$$

where f2 is a focal distance of the second lens group in the condition that the infinite is in focus, and
f3 is a focal distance of the third lens group in the condition that the infinite is in focus.

[4]

The wide-angle lens according to any one of [1] to [3], wherein the first lens group includes at least one aspheric surface.

[5]

The wide-angle lens according to any of [1] to [4], further including a lens substantially having no refractive power.

[6]

A wide-angle lens including:
a first lens group that has positive refractive power;
an aperture stop;
a second lens group that has negative refractive power; and
a third lens group that has positive refractive power, the first lens group, the aperture stop, the second lens group, and the third lens group being disposed in order from the object side toward image side, wherein
focusing is performed through causing the second lens group to travel toward the image side upon variation in subject distance from infinite to proximity, and
the first lens group includes a negative lens and at least one aspheric lens, the negative lens being disposed on most-object side and has a convex surface facing the object side.

[7]

The wide-angle lens according to [6], wherein the following conditional expression is further satisfied, $$0.5<f1/f<1.0 \tag{1}$$

where f1 is a focal distance of the first lens group in a condition that the infinite is in focus, and
f is a focal distance of a whole system in the condition that the infinite is in focus.

[8]

The wide-angle lens according to [6] or [7], wherein
the first lens group includes a front lens group and a rear lens group that are disposed in order from the object side with a maximum lens spacing in between on an optical axis, the front lens group having negative refractive power, the rear lens group having positive refractive power, and
the following conditional expression is satisfied, $$0.9 \leq f1R/f1<1.5 \tag{2}$$

where f1R is a focal distance of the rear lens group in a condition that the infinite is in focus, and
f1 is a focal distance of the first lens group in the condition that the infinite is in focus.

[9]

The wide-angle lens according to any one of [6] to [8], wherein the following conditional expression is further satisfied, $$-1.0<f2/f3<-0.5 \tag{3}$$

where f2 is a focal distance of the second lens group in a condition that the infinite is in focus, and f3 is a focal distance of the third lens group in the condition that the infinite is in focus.

[10]

The wide-angle lens according to any of [6] to [9], further including a lens substantially having no refractive power.

[11]

An imaging unit with a wide-angle lens and an imaging device that outputs an imaging signal based on an optical image formed by the wide-angle lens, the wide-angle lens including:

a first lens group that has positive refractive power;
an aperture stop;
a second lens group that has negative refractive power; and
a third lens group that has positive refractive power, the first lens group, the aperture stop, the second lens group, and the third lens group being disposed in order from the object side toward image side, wherein
focusing is performed through causing the second lens group to travel toward the image side upon variation in subject distance from infinite to proximity,
the first lens group includes a negative lens and at least one cemented lens, the negative lens being disposed on most-object side and has a convex surface facing the object side, and
the following conditional expression is satisfied, $$0.5 < f1/f < 1.0 \quad (1)$$

where f1 is a focal distance of the first lens group in a condition that the infinite is in focus, and
f is a focal distance of a whole system in the condition that the infinite is in focus.

[12]

The imaging unit according to [11], wherein the wide-angle lens further includes a lens substantially having no refractive power.

[13]

An imaging unit with a wide-angle lens and an imaging device that outputs an imaging signal based on an optical image formed by the wide-angle lens, the wide-angle lens including:

a first lens group that has positive refractive power;
an aperture stop;
a second lens group that has negative refractive power; and
a third lens group that has positive refractive power, the first lens group, the aperture stop, the second lens group, and the third lens group being disposed in order from the object side toward image side, wherein
focusing is performed through causing the second lens group to travel toward the image side upon variation in subject distance from infinite to proximity, and
the first lens group includes a negative lens and at least one aspheric lens, the negative lens being disposed on most-object side and has a convex surface facing the object side.

[14]

The imaging unit according to [13], wherein the wide-angle lens further includes a lens substantially having no refractive power.

This application is based upon and claims the benefit of priority of the Japanese Patent Application No. 2014-207959 filed in the Japan Patent Office on Oct. 9, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A wide-angle lens, comprising:
a first lens group that has positive refractive power;
an aperture stop;
a second lens group that has negative refractive power; and
a third lens group that has positive refractive power, wherein
the first lens group, the aperture stop, the second lens group, and the third lens group are arranged in order from an object side toward an image side,
a focusing operation is based on a movement of the second lens group toward the image side upon variation in subject distance from infinite to proximity,
the first lens group includes a negative lens, a first lens that has negative refractive power, a second lens that has positive refractive power, and at least one cemented lens,
the negative lens, the first lens, the second lens, and the at least one cemented lens are arranged in order from the object side toward the image side,
the negative lens is closer to the object side than remaining lenses of the first lens group and the negative lens has a convex surface that faces the object side, and
the following conditional expression is satisfied,

$$0.5 < f1/f < 1.0 \quad (1)$$

where f1 is a focal distance of the first lens group in a condition that the infinite is in focus, and f is a focal distance of a whole system in the condition that the infinite is in focus.

2. The wide-angle lens according to claim 1, wherein
the first lens group includes a front lens group and a rear lens group that are arranged in order from the object side with a maximum lens spacing in between on an optical axis, the front lens group has negative refractive power, the rear lens group has positive refractive power, and
the following conditional expression is satisfied, $$0.9 \leq f1R/f1 < 1.5 \quad (2)$$

where f1R is a focal distance of the rear lens group in the condition that the infinite is in focus.

3. The wide-angle lens according to claim 1, wherein the following conditional expression is further satisfied, $$-1.0 < f2/f3 < -0.5 \quad (3)$$

where f2 is a focal distance of the second lens group in the condition that the infinite is in focus, and
f3 is a focal distance of the third lens group in the condition that the infinite is in focus.

4. The wide-angle lens according to claim 1, wherein the first lens group includes at least one aspheric surface.

5. A wide-angle lens, comprising:
a first lens group that has positive refractive power;
an aperture stop;
a second lens group that has negative refractive power; and
a third lens group that has positive refractive power, wherein the first lens group, the aperture stop, the second lens group, and the third lens group are arranged in order from an object side toward an image side, a focusing operation is based on a movement of the second lens group toward the image side upon variation in subject distance from infinite to proximity, and the first lens group includes a negative lens, a first lens that has positive refractive power, a second lens that has negative refractive power, a cemented lens, and at least one aspheric lens, the negative lens, the first lens, the second lens, the cemented lens, and the at least one aspheric lens are arranged in order from the object side toward the image side, the second lens has a convex surface that faces the object side, the negative lens is closer to the object side than remaining lenses of the first lens group and the negative lens has a convex surface that faces the object side.

6. The wide-angle lens according to claim 5, wherein the following conditional expression is further satisfied, $$0.5 < f1/f < 1.0 \quad (1)$$

where f1 is a focal distance of the first lens group in a condition that the infinite is in focus, and f is a focal distance of a whole system in the condition that the infinite is in focus.

7. The wide-angle lens according to claim 5, wherein the first lens group includes a front lens group and a rear lens group that are arranged in order from the object side with a maximum lens spacing in between on an optical axis, the front lens group has negative refractive power, the rear lens group has positive refractive power, and the following conditional expression is satisfied, $$0.9 \leq f1R/f1 < 1.5 \quad (2)$$

where f1R is a focal distance of the rear lens group in a condition that the infinite is in focus, and f1 is a focal distance of the first lens group in the condition that the infinite is in focus.

8. The wide-angle lens according to claim 5, wherein the following conditional expression is further satisfied, $$-1.0 < f2/f3 < -0.5 \quad (3)$$

where f2 is a focal distance of the second lens group in a condition that the infinite is in focus, and f3 is a focal distance of the third lens group in the condition that the infinite is in focus.

9. An imaging unit, comprising:

a wide-angle lens and an imaging device configured to output an imaging signal based on an optical image formed by the wide-angle lens, the wide-angle lens comprising:

a first lens group that has positive refractive power;
an aperture stop;
a second lens group that has negative refractive power; and a third lens group that has positive refractive power, wherein the first lens group, the aperture stop, the second lens group, and the third lens group are arranged in order from an object side toward an image side, a focusing operation is based on a movement of the second lens group toward the image side upon variation in subject distance from infinite to proximity, the first lens group includes a negative lens, a first lens that has negative refractive power, a second lens that has positive refractive power, and at least one cemented lens, the negative lens, the first lens, the second lens, and the at least one cemented lens are arranged in order from the object side toward the image side, the negative lens is closer to the object side than remaining lenses of the first lens group and the negative lens has a convex surface facing that faces the object side, and the following conditional expression is satisfied, $$0.5 < f1/f < 1.0 \quad (1)$$

where f1 is a focal distance of the first lens group in a condition that the infinite is in focus, and f is a focal distance of a whole system in the condition that the infinite is in focus.

10. An imaging unit, comprising:

a wide-angle lens and an imaging device configured to output an imaging signal based on an optical image formed by the wide-angle lens, the wide-angle lens comprising:

a first lens group that has positive refractive power;
an aperture stop;
a second lens group that has negative refractive power; and a third lens group that has positive refractive power, wherein the first lens group, the aperture stop, the second lens group, and the third lens group are arranged in order from an object side toward an image side, a focusing operation is based on a movement of the second lens group toward the image side upon variation in subject distance from infinite to proximity, and the first lens group includes a negative lens, a first lens that has positive refractive power, a second lens that has negative refractive power, a cemented lens, and at least one aspheric lens, the negative lens, the first lens, the second lens, the cemented lens, and the at least one aspheric lens are arranged in order from the object side toward the image side, the second lens has a convex surface that faces the object side, the negative lens is closer to the object side than remaining lenses of the first lens group and the negative lens has a convex surface that faces the object side.

* * * * *